(12) United States Patent
Suginouchi et al.

(10) Patent No.: US 7,073,395 B2
(45) Date of Patent: Jul. 11, 2006

(54) ULTRASONIC FLOWMETER AND ULTRASONIC FLOW RATE MEASURING METHOD

(75) Inventors: Takehiko Suginouchi, Nara (JP); Masahiko Hashimoto, Shijonawate (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 35 days.

(21) Appl. No.: 10/502,698

(22) PCT Filed: Oct. 29, 2003

(86) PCT No.: PCT/JP03/13886

§ 371 (c)(1),
(2), (4) Date: Jul. 27, 2004

(87) PCT Pub. No.: WO2004/048902

PCT Pub. Date: Jun. 10, 2004

(65) Prior Publication Data

US 2005/0072248 A1 Apr. 7, 2005

(30) Foreign Application Priority Data

Nov. 26, 2002 (JP) ............................. 2002-342299

(51) Int. Cl.
*G01F 1/66* (2006.01)

(52) U.S. Cl. ............................. 73/861.27; 73/861.28
(58) Field of Classification Search . 73/861.27–861.29
See application file for complete search history.

(56) References Cited

U.S. PATENT DOCUMENTS

| 3,894,431 | A | | 7/1975 | Muston |
| 4,483,202 | A | * | 11/1984 | Ogura et al. ............. 73/861.27 |
| 5,123,286 | A | | 6/1992 | Baumgartner |
| 5,277,070 | A | | 1/1994 | Dorr |

FOREIGN PATENT DOCUMENTS

| JP | 2001-116599 A | 4/2001 |
| JP | 2001-317975 A | 11/2001 |
| JP | 2002-071411 A | 3/2002 |

OTHER PUBLICATIONS

EP-03769993 Search Report of Mar. 3, 2006.

* cited by examiner

*Primary Examiner*—Harshad Patel
(74) *Attorney, Agent, or Firm*—Akin Gump Strauss Hauer & Feld, LLP

(57) ABSTRACT

An ultrasonic flowmeter of the present invention includes: first and second ultrasonic transducers that send and receive an ultrasonic wave and are arranged so as to form a propagation path for the ultrasonic wave in a flow path of fluid; a transmission unit and a reception unit that drive the first ultrasonic transducer and the second ultrasonic transducer such that the ultrasonic wave is sent and received in two ways between the first ultrasonic transducer and the second ultrasonic transducer, and receive the ultrasonic wave; a zero-cross detection unit that measures a propagation time of the ultrasonic wave by subjecting a received signal generated by the ultrasonic wave received in the reception unit to zero-cross detection; and a correction unit that reduces an error in the zero-cross detection caused by noise superimposed on the received signal, in which the ultrasonic flowmeter calculates a flow volume of the fluid on the basis of the propagation time.

22 Claims, 26 Drawing Sheets

FIG. 2
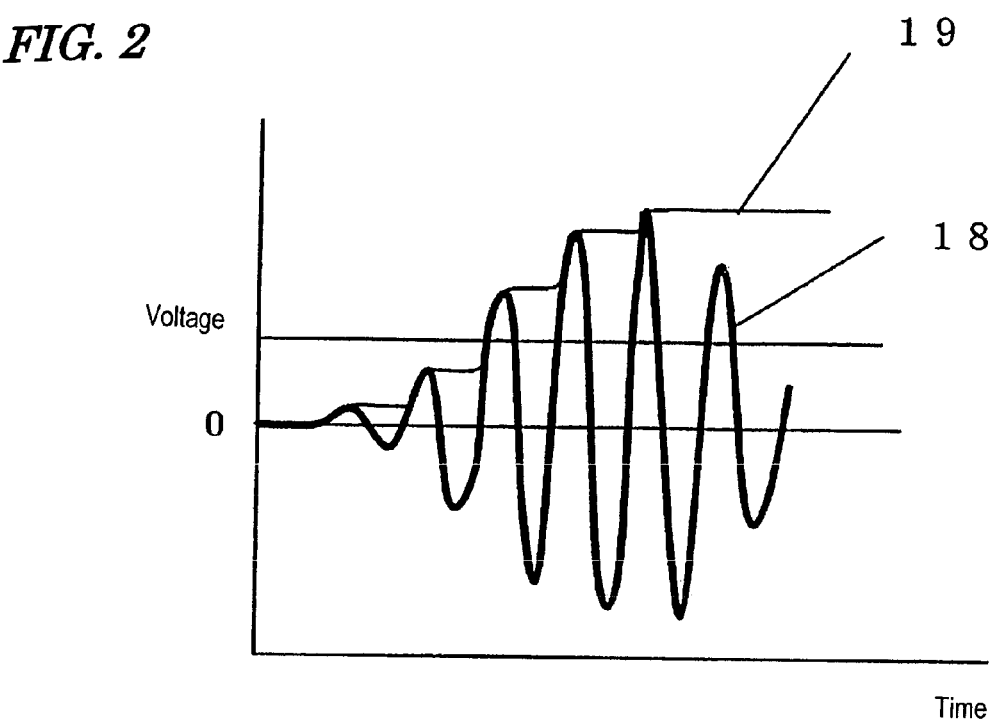
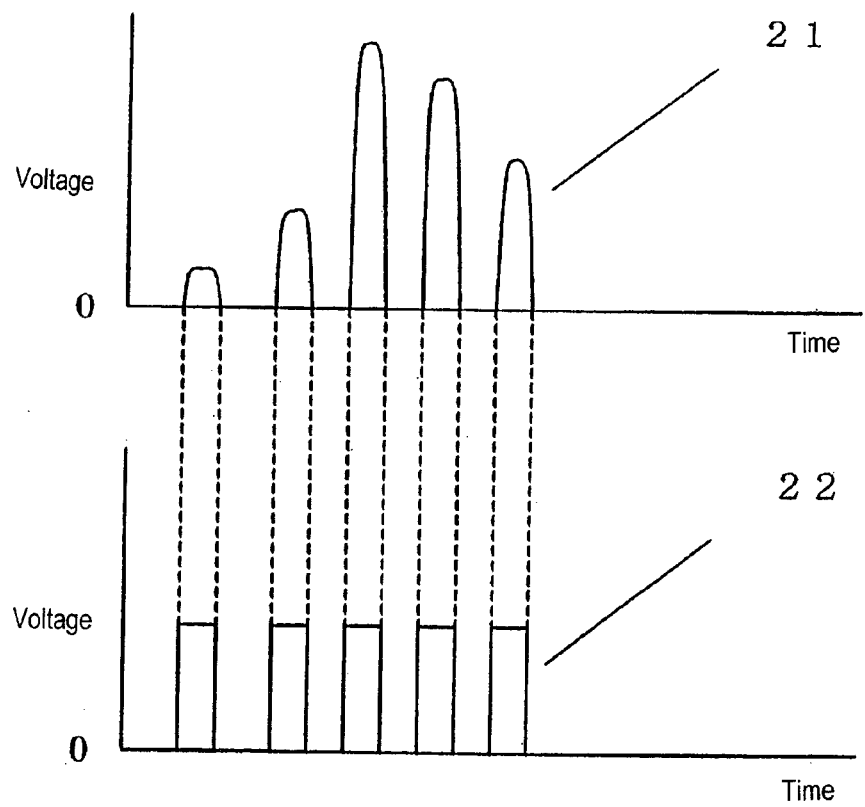

*FIG. 9*
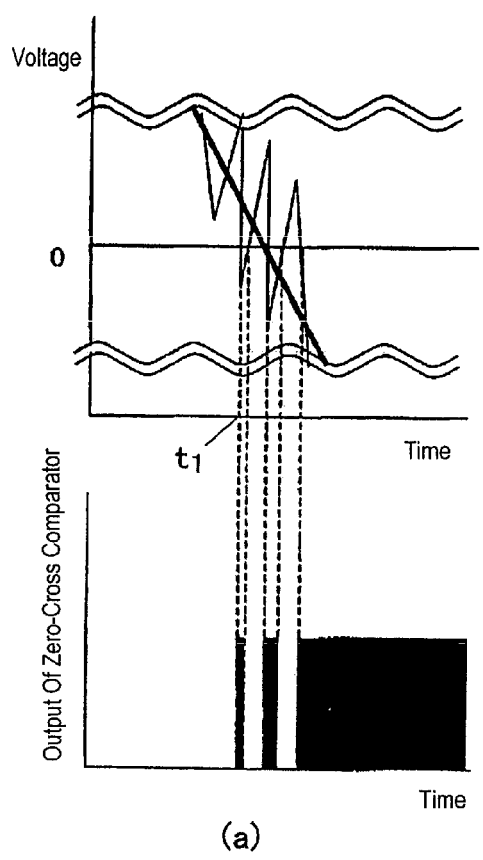
(a)
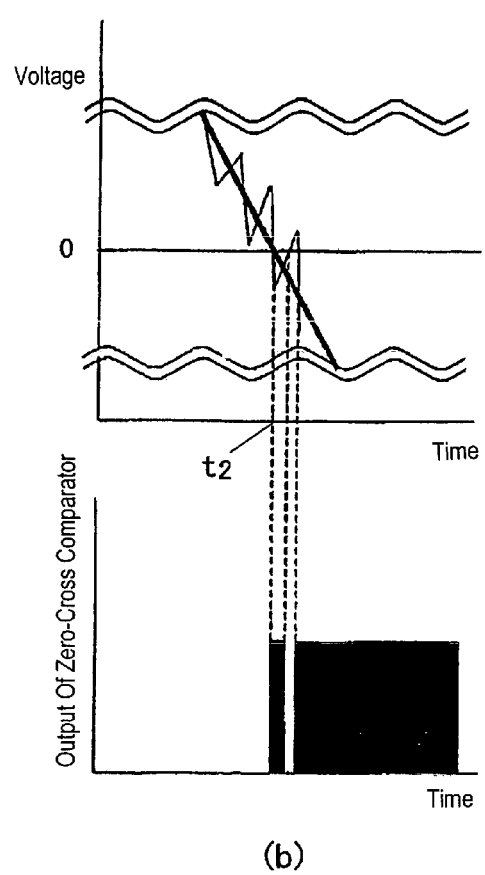
(b)

Number Of Times Of Sing Around

*(PRIOR ART)*

FIG. 26    (PRIOR ART)
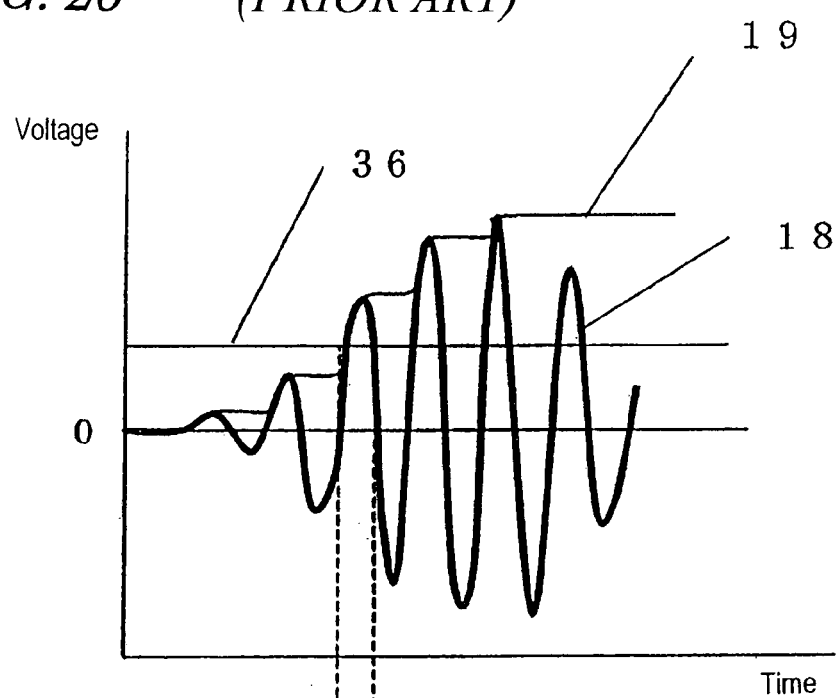
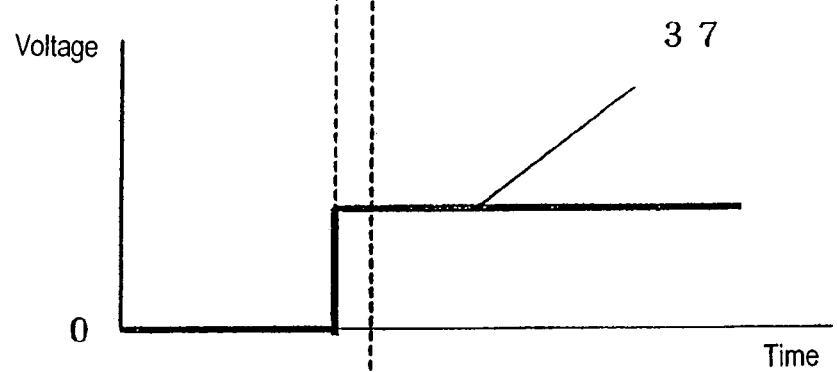
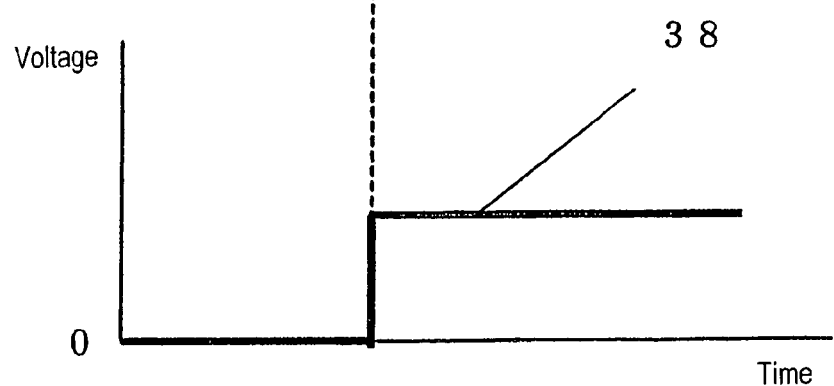

ULTRASONIC FLOWMETER AND ULTRASONIC FLOW RATE MEASURING METHOD

CROSS-REFERENCE TO RELATED APPLICATIONS

This application is a section 371 of International Application No. PCT/JP2003/013886, filed Oct. 29, 2003, the disclosure of which is incorporated herein by reference.

TECHNICAL FIELD

The present invention relates to an ultrasonic flowmeter for measuring a flow volume of fluid using ultrasonic waves and a flow measurement method by an ultrasonic wave. In addition, the present invention relates to a gas meter.

BACKGROUND ART

The ultrasonic flowmeter is characterized in that, for example, a structure is simple, there are a fewer number of mechanical movable parts, a measurable range of a flow volume is wide, and there is no pressure loss due to a flowmeter. In addition, the advances in the electronics technology in recent years has made it possible to improve measurement accuracy of the ultrasonic flowmeter. Therefore, researches for use of the ultrasonic flowmeter have been conducted in various fields, in which measurement of a flow volume of gas or fluid is necessary, such as a gas meter.

A structure and a measurement principle of a conventional ultrasonic flowmeter will be hereinafter explained. FIG. 25 is a block diagram showing an example of the conventional ultrasonic flowmeter. Ultrasonic transducers 1 and 2 are arranged across a flow path 12 in which fluid flows. The ultrasonic transducers 1 and 2 function as a transmitter and a receiver, respectively. More specifically, in the case in which the ultrasonic transducer 1 is used as a transmitter, the ultrasonic transducer 2 is used as a receiver. In the case in which the ultrasonic transducer 2 is used as a transmitter, the ultrasonic transducer 1 is used as a receiver. As shown in FIG. 25, a propagation path for ultrasonic waves, which is formed between the ultrasonic transducers 1 and 2, is inclined by an angle θ with respect to a direction in which the fluid flows.

When an ultrasonic wave is propagated from the ultrasonic transducer 1 to the ultrasonic transducer 2, since the ultrasonic wave travels in a forward direction with respect to a flow of the fluid, a velocity thereof increases. On the other hand, when an ultrasonic wave is propagated from the ultrasonic transducer 2 to the ultrasonic transducer 1, since the ultrasonic wave travels in a reverse direction with respect to the flow of the fluid, the velocity thereof decreases. Therefore the velocity of the fluid can be calculated from a difference between a time in which the ultrasonic wave is propagated from the ultrasonic transducer 1 to the ultrasonic transducer 2 and a time in which the ultrasonic wave is propagated from the ultrasonic transducer 2 to the ultrasonic transducer 1. In addition, a flow volume can be calculated from a product of a cross section of the flow path 12 and the flow velocity.

As a specific method of calculating a flow volume of fluid in accordance with the above-mentioned principle, a measurement method according to the sing around method will be explained specifically.

As shown in FIG. 25, the ultrasonic flowmeter includes a transmission circuit 3 and a reception circuit 6, and the ultrasonic transducer 1 is selectively connected to one of the transmission circuit 3 and the reception circuit 6 by a switching unit 10. In this case, the ultrasonic transducer 2 is connected to the other of the transmission circuit 3 and the reception circuit 6 to which the ultrasonic transducer 1 is not connected.

When the transmission circuit 3 and the ultrasonic transducer 1 are connected, the transmission circuit 3 drives the ultrasonic transducer 1, and a generated ultrasonic wave reaches the ultrasonic transducer 2 across the flow of the liquid. The ultrasonic wave, which is received by the ultrasonic transducer 2, is converted into an electrical signal, and a received signal is amplified by the reception circuit 6. A level of the received signal is detected by a level detection circuit 5.

FIG. 26 indicates an example of zero-cross detection in the conventional ultrasonic flowmeter. A peak hold circuit 13 generates a peak hold signal 19 from a received signal 18. The level detection circuit 5 detects that the peak hold signal 19 has reached a predetermined level 36 and generates a detection signal 37. A zero-cross detection circuit 7 detects a zero-cross point immediately after the detection signal 37 is generated, and a zero-cross detection signal 38 is generated. The zero-cross point is a point where amplitude of a received signal changes from positive to negative or negative to positive. This zero-cross point is assumed to be time when the ultrasonic wave has reached in the ultrasonic transducer 2. A trigger signal is generated in a delay circuit 4 at timing delayed by a predetermined time on the basis of the zero-cross detection signal 38. It is judged in a repetition unit 8 whether the zero-cross detection is to be repeated, and if the zero-cross detection is to be repeated, the trigger signal is inputted to the transmission circuit 3. A time from the generation of the zero-cross detection signal 38 to the generation of the trigger signal is called a delay time.

The transmission circuit 3 drives the ultrasonic transducer 1 on the basis of the trigger signal to generate the next ultrasonic wave. Repetition of a loop of transmission—reception—amplification/delay—transmission of an ultrasonic wave in this way is referred to as sing around, and the number of times of a transmission/reception loop is referred to as the number of times of sing around.

In a timing circuit 9, a time required for repeating the transmission/reception loop for a predetermined number of times is measured, and a result of the measurement is sent to a flow volume calculation unit 11. Next, the switching circuit 10 is switched to use the ultrasonic transducer 2 as a transmitter and the ultrasonic transducer 1 is used as a receiver, and measurement is performed in the same manner.

A value calculated by subtracting a value, which is calculated by multiplying the delay time by the number of times of sing around, from the time measured by the above-mentioned method to obtain a difference and dividing the difference by the number of times of sing around is a propagation time of the ultrasonic wave.

It is assumed that a propagation time at the time when the ultrasonic transducer 1 is set on the transmission side is t1 and a propagation time at the time when the ultrasonic transducer 2 is set on the transmission side is t2. In addition, as shown in FIG. 25, it is assumed that a distance between the ultrasonic transducer 1 and the ultrasonic transducer 2 is L and a flow velocity of fluid and a velocity of sound of an ultrasonic wave are V and C, respectively. In this case, t1 and t2 are represented by the following formula (1).

$$t1 = \frac{L}{C + V\cos\theta}$$
$$t2 = \frac{L}{C - V\cos\theta}$$
(1)

From these formulas, the flow velocity V is represented by the following formula (2).

$$V = \frac{L}{2\cos\theta}\left(\frac{1}{t1} - \frac{1}{t2}\right)$$
(2)

If the flow velocity V of the fluid is calculated, a flow volume Q is calculated from a product of a cross section of a flow path 14 and the flow velocity V.

In the above-described ultrasonic flowmeter, depending upon a flow volume, amplitude of a received ultrasonic waveform may vary significantly between the case in which an ultrasonic wave is propagated in a direction from the ultrasonic transducer 1 to the ultrasonic transducer 2, which is a direction in which the ultrasonic wave travels in a forward direction with respect to a flow of fluid, and the case in which an ultrasonic wave is propagated in a direction from the ultrasonic transducer 2 to the ultrasonic transducer 1, which is a direction in which the ultrasonic wave travels in a reverse direction with respect to a flow of fluid. In a state in which the flow of the fluid is disrupted, the amplitude may fluctuate significantly during sing around. In such a case, a zero-cross point immediately after the peak hold signal 19 has reached the predetermined level 36 is not always a point that is a predetermined wave number after a received waveform, and a measurement error occurs.

In order to solve such a problem, Japanese Patent Application Laid-Open No. 2001-116599 discloses a technique for using a received signal detection reference signal, which changes with time, as the predetermined level 36 to perform zero-cross detection at a predetermined wave number position of a received waveform.

In the above-described laid-open patent application, in the case in which time when a received wave reaches is earlier or later than a reference, the received signal detection reference signal is generated assuming that amplitude of the received wave decreases. However, in the case in which a flow of fluid is disrupted, it is likely that a magnitude of the amplitude does not always change as assumed and a measurement error occurs.

In addition, in the ultrasonic flowmeter of the above-described laid-open patent application, a measurement error due to noise cannot be reduced. FIG. 27 schematically shows an ultrasonic received signal obtained by amplifying an ultrasonic wave, which is detected by an ultrasonic transducer, in a reception circuit. As shown in FIG. 27, usually, a noise 39 is superimposed on an ultrasonic received signal 18. In such a case, a zero-cross point 40 is generated by noise at a point before an original zero-cross point 41. In this case, when amplitude of the ultrasonic received signal 18 changes, an inclination of the ultrasonic received signal 18 crossing a zero point changes, whereby the zero-cross point 40 generated by the superimpose noise 39 also shifts. In such a case, it is likely that a wrong propagation time is measured.

Moreover, in the case in which an apparatus, which consumes fluid flowing in a pipe, is connected to the pipe to which the ultrasonic flowmeter is connected, ripple may occur in the fluid flowing in the pipe due to an operation of the apparatus. Ripple means a periodical fluctuation in a change in a flow velocity of the fluid. In such a case, even if the zero-cross detection is performed by detecting a predetermined wave number position of a received wave, influence due to the ripple cannot be eliminated, the flow velocity fluctuates due to the ripple, and a measurement result different from an actual flow volume is calculated.

Therefore, in the case in which a gas meter is manufactured using the conventional ultrasonic flowmeter, it is likely that a large number of errors are included in a measured gas flow volume. In addition to the likelihood that an error simply occurs in measurement, it is also likely that, if a gas leak detection function is added to the gas meter, reliability of the detection function is deteriorated. In particular, in the case of the gas meter using the ultrasonic flowmeter, unlike a conventional diaphragm gas meter, since a flow volume of fluid flowing back in a pipe is also detected, the gas meter is significantly affected by the ripple.

DISCLOSURE OF INVENTION

It is an object of the present invention to provide an ultrasonic flowmeter and a measurement method for a flow volume that are capable of performing highly accurate measurement. An ultrasonic flowmeter of the present invention includes: first and second ultrasonic transducers that send and receive an ultrasonic wave and are arranged so as to form a propagation path for the ultrasonic wave in a flow path of fluid; a transmission unit and a reception unit that drive the first ultrasonic transducer and the second ultrasonic transducer such that the ultrasonic wave is sent and received in two ways between the first ultrasonic transducer and the second ultrasonic transducer, and receive the ultrasonic wave; a zero-cross detection unit that measures a propagation time of the ultrasonic wave by subjecting a received signal generated by the ultrasonic wave received in the reception unit to zero-cross detection; and a correction unit that reduces an error in the zero-cross detection caused by noise superimposed on the received signal, in which the ultrasonic flowmeter calculates a flow volume of the fluid on the basis of the propagation time.

In a preferable embodiment, the correction unit corrects the flow volume of the fluid on the basis of a magnitude of amplitude of the received signal.

In a preferred embodiment, the correction unit includes: a level detection unit that measures amplitude of a predetermined wave of the received signal; and a correction data storage unit that stores data indicating a relation between the amplitude of the predetermined wave and the propagation time of the received signal, and the correction unit corrects the propagation time according to a magnitude of the amplitude of the predetermined wave on the basis of the data.

In a preferred embodiment, the ultrasonic flowmeter receives an ultrasonic wave plural times in one of the first ultrasonic transducer and the second ultrasonic transducer with a sing around method, the correction unit includes: a level detection unit that measures amplitudes of predetermined waves of plural received signals generated by receiving the ultrasonic wave plural times, respectively; a level average unit that calculates an average of magnitudes of the amplitudes of the plural received signals; and a correction data storage unit that stores data indicating a relation between the amplitudes of the predetermined waves and the propagation time of the received signals, and the correction unit corrects the propagation time according to the average of the magnitudes of the amplitudes on the basis of the data.

In a preferred embodiment, the zero-cross detection unit has a comparator for finding a zero-cross point, and the correction unit corrects the flow volume of the fluid on the basis of the number of times of chattering of the comparator that is caused when the received signal is subjected to the zero-cross detection.

In a preferred embodiment, the correction unit includes: a counter that measures the number of times of chattering; and a correction data storage unit that stores data indicating a relation between the number of times of chattering and a propagation time, and the correction unit corrects the propagation time according to the number of times of chattering on the basis of the data.

In a preferred embodiment, depending upon whether the zero-cross detection for the received signal is performed at a falling edge of a signal or a rising edge of a signal, the correction unit uses a voltage set to a negative or positive value as a reference voltage for the zero-cross detection.

In a preferred embodiment, the ultrasonic flowmeter receives an ultrasonic wave plural times in one of the first ultrasonic transducer and the second ultrasonic transducer with the sing around method, and the correction unit offsets a reference voltage for performing the zero-cross detection for the next received signal on the basis of a magnitude of amplitude of an immediately preceding received signal among plural received signals generated by receiving the ultrasonic wave plural times.

In a preferred embodiment, the correction unit includes: a level detection unit that measures amplitude of a predetermined wave of the immediately preceding received signal; and a correction data storage unit that stores data indicating a relation between amplitude of a wave of the received signal and a reference voltage for performing the zero-cross detection, and the correction unit calculates a value of the reference voltage according to a magnitude of the amplitude on the basis of the data.

In a preferred embodiment, the correction unit includes: an integration unit that calculates a value obtained by integrating a rising edge part of the immediately preceding received signal for a predetermined time; and a correction data storage unit that store data indicating a relation between the integrated value and a reference voltage for performing the zero-cross detection, and the correction unit calculates a value of the reference voltage according to a magnitude of the integrated value on the basis of the data.

In a preferred embodiment, the predetermined wave of the received signal is a wave subjected to the zero-cross detection.

In addition, the ultrasonic flowmeter of the present invention includes: first and second ultrasonic transducers that send and receive an ultrasonic wave and are arranged so as to form a propagation path for the ultrasonic wave in a flow path of fluid; a transmission unit and a reception unit that drive the first ultrasonic transducer and the second ultrasonic transducer such that the ultrasonic wave is sent and received in two ways between the first ultrasonic transducer and the second ultrasonic transducer, and receive the ultrasonic wave; a wave number measurement unit that measures a wave number of a received signal generated by the ultrasonic waved received by the reception unit; a zero-cross detection unit that measures a propagation time of the ultrasonic wave by subjecting a wave after a predetermined wave number of the received signal to zero-cross detection on the basis of an output obtained from the wave number measurement unit, in which the ultrasonic flowmeter calculates a flow volume of the fluid on the basis of the propagation time.

In a preferred embodiment, the wave number measurement unit includes: a peak hold unit that holds a peak value of the received signal and outputs the value as a peak hold signal; a differentiation unit that differentiates the peak hold signal; and a counter that counts the number of waves outputted from the differentiation unit.

In addition, an ultrasonic flowmeter of the present invention includes: first and second ultrasonic transducers that send and receive an ultrasonic wave and are arranged so as to form a propagation path for the ultrasonic wave in a flow path of fluid; a transmission unit and a reception unit that drive the first ultrasonic transducer and the second ultrasonic transducer such that the ultrasonic wave is sent and received in two ways between the first ultrasonic transducer and the second ultrasonic transducer, and receive the ultrasonic wave; a zero-cross detection unit that measures a propagation time of the ultrasonic wave by subjecting a received signal generated by the ultrasonic wave received by the reception unit to zero-cross detection; and a correction unit that reduces a measurement error due to a ripple of the fluid, in which the ultrasonic flowmeter calculates a flow volume of the fluid on the basis of the propagation time.

In a preferred embodiment, the ultrasonic flowmeter is an ultrasonic flowmeter that receives an ultrasonic wave plural times in two ways, respectively, between the first ultrasonic transducer and the second ultrasonic transducer with a sing around method, in which the correction unit calculates a period of amplitude fluctuation of plural received signals, which are generated by receiving the ultrasonic wave plural times, among the plural received signals and determines the number of times of a loop of the sing around or a delay time on the basis of the period.

In a preferred embodiment, the correction unit determines the number of times of a loop of the sing around and the delay time such that a period of measurement by the sing around method is about one or more integer times as long as the period of the amplitude fluctuation.

A gas meter of the present invention includes the ultrasonic flowmeter defined in any one of the above-described embodiments.

In addition, a flow volume measurement method by an ultrasonic wave of the present invention measures a flow volume of fluid on the basis of a propagation time difference of an ultrasonic wave.

In a preferred embodiment, the flow volume measurement method includes the steps of: sending an ultrasonic wave from a first ultrasonic transducer to fluid and receiving the ultrasonic wave in a second ultrasonic transducer; measuring a propagation time of the ultrasonic wave by subjecting a received signal generated by the received ultrasonic wave to zero-cross detection; measuring amplitude of the received signal; and correcting the propagation time on the basis of the amplitude of the received signal.

In a preferred embodiment, the flow volume measurement method includes the steps of: sending an ultrasonic wave plural times from a first ultrasonic transducer to fluid and receiving the ultrasonic wave plural times in a second ultrasonic transducer with a sing around method; measuring a propagation time of the ultrasonic wave, which is received plural times, by subjecting plural received signals due to the ultrasonic wave received plural times to zero-cross detection; measuring amplitudes of the plural received signals; and calculating an average value of the amplitudes of the plural received signals and correcting the propagation time on the basis of the average value.

In a preferred embodiment, the step of measuring amplitude measures amplitude of a wave of a received signal subjected to the zero-cross detection.

In a preferred embodiment, the flow volume measurement method includes the steps of: sending an ultrasonic wave from a first ultrasonic transducer to fluid and receiving the ultrasonic wave in a second ultrasonic transducer; measuring a propagation time of the ultrasonic wave by subjecting a received signal generated by the received ultrasonic wave to zero-cross detection; measuring the number of times of chattering of a comparator that occurs at the time of the zero-cross detection; and correcting the propagation time on the basis of the number of chattering.

In a preferred embodiment, the flow volume measurement method includes the steps of: sending an ultrasonic wave from a first ultrasonic transducer to fluid and receiving the ultrasonic wave in a second ultrasonic transducer; measuring a propagation time of the ultrasonic wave by subjecting a received signal generated by the received ultrasonic wave to zero-cross detection; and calculating a flow volume of the fluid on the basis of the propagation time, in which the flow volume measurement method sets a reference potential for the zero-cross detection set to a negative voltage or a positive performed at a rising edge of a signal or a falling edge of a signal.

In a preferred embodiment, the flow volume measurement method includes the steps of: sending an ultrasonic wave from a first ultrasonic transducer to fluid and receiving the ultrasonic wave in a second ultrasonic transducer; measuring amplitude of a received signal generated by the received ultrasonic wave; and of measuring a propagation time of the ultrasonic wave by subjecting the received signal to zero-cross detection, in which the flow volume measurement method repeats the reception step, the amplitude measurement step, and the propagation time measurement step with a sing around method and offsets a reference voltage for performing the zero-cross detection for the next received signal on the basis of a magnitude of the amplitude of the received signal measured in the amplitude measurement step.

In a preferred embodiment, the flow volume measurement method includes the steps of: sending an ultrasonic wave from a first ultrasonic transducer to fluid and receiving the ultrasonic wave in a second transducer; calculating a value obtained by integrating a rising edge part of a received signal generated by the received ultrasonic wave for a predetermined time; and measuring a propagation time of the ultrasonic wave by subjecting the received signal to zero-cross detection, in which the flow volume measurement method repeats the reception step, the step of calculating an integrated value, and the propagation time measurement step with a sing around method and offsets a reference voltage for performing the zero-cross detection for the next received signal on the basis of the integrated value of the received signal calculated in the step of calculating an integrated value.

In a preferred embodiment, the flow volume measurement method includes the steps of: sending an ultrasonic wave from a first ultrasonic transducer to fluid and receiving the ultrasonic wave in a second ultrasonic transducer; measuring a wave number of a received signal generated by the received ultrasonic wave; and measuring a propagation time of the ultrasonic wave by subjecting a wave after a predetermined wave number of the received signal to zero-cross detection.

In a preferred embodiment, the flow volume measurement method includes the steps of: sending an ultrasonic wave from a first ultrasonic transducer to fluid plural times and receiving the ultrasonic wave in a second ultrasonic transducer plural times with a sing around method; and measuring a propagation time of the ultrasonic wave, which is received plural times, by subjecting plural received signals due to the ultrasonic wave received plural times to zero-cross detection, in which the flow volume measurement method calculates a period of fluctuation in amplitude among the plural received signals generated by receiving the ultrasonic wave plural times and determines the number of times of a loop of the sing around or a delay time on the basis of the period.

In a preferred embodiment, the flow volume measurement method determines the number of times of a loop of the sing around or a delay time such that a period of the measurement of the sing around method is about one or more integer times as long as the period of the amplitude fluctuation.

In addition, a computer readable recording medium of the present invention has recorded therein a program for causing a computer to execute the respective steps defined in the flow volume measurement method by an ultrasonic wave of any one of the above-described embodiments.

BRIEF DESCRIPTION OF DRAWINGS

FIG. 2 is a graph illustrating signal processing for measuring a wave number in a wave number measurement unit of the ultrasonic flowmeter shown in FIG. 1.

FIGS. 9(a) and (b) are diagrams showing a difference of the number of chatterings at the time of zero-cross detection that is caused by a difference in an inclination of an ultrasonic received signal.

FIG. 26 is a diagram illustrating zero-cross detection in a zero-cross detection unit of the conventional ultrasonic flowmeter.

BEST MODE FOR CARRYING OUT THE INVENTION

EMBODIMENT 1

Figure 1:
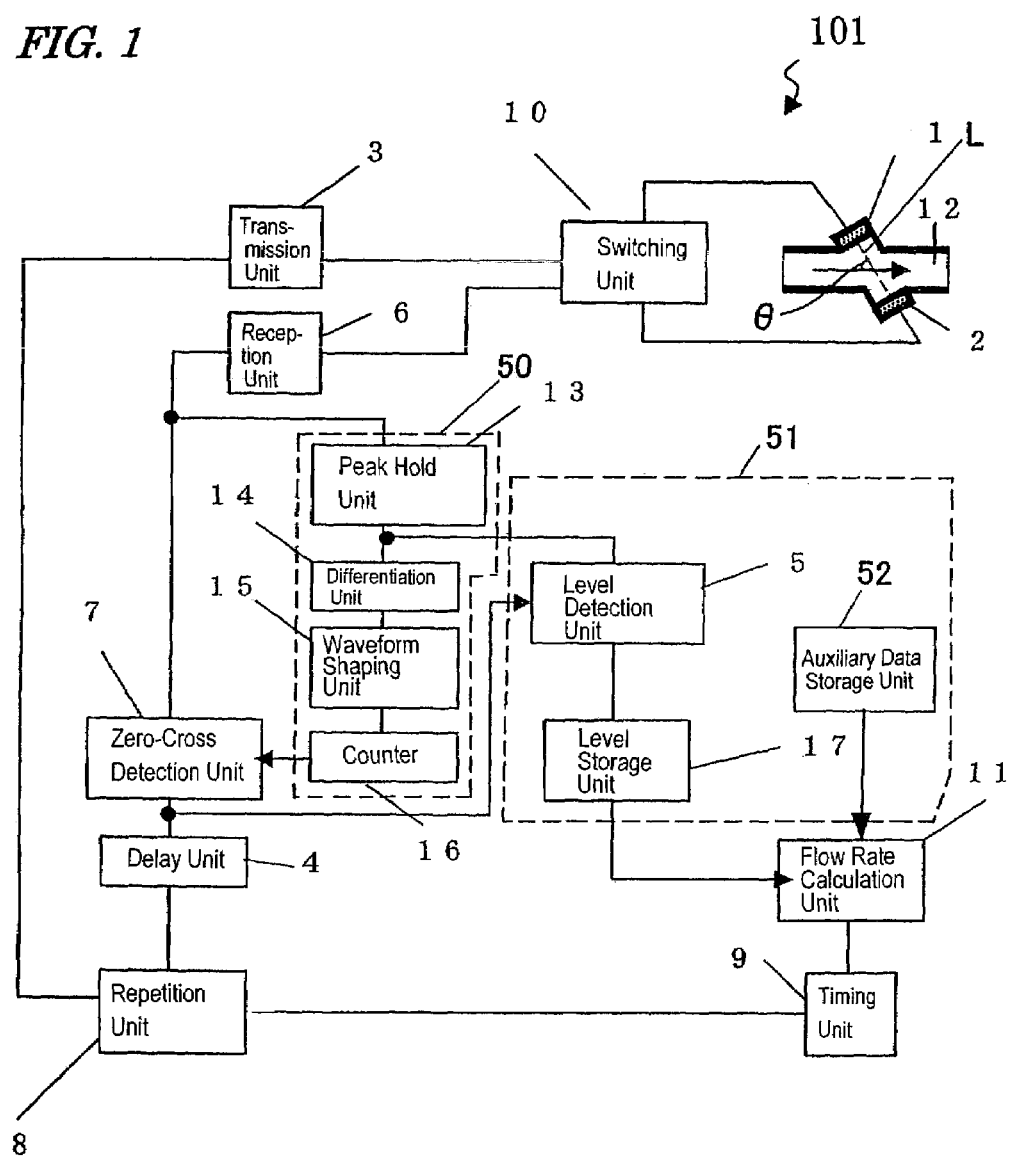
FIG. 1 is a block diagram showing a first embodiment of an ultrasonic flowmeter of the present invention.

FIG. 1 is a block diagram showing a first embodiment of an ultrasonic flowmeter according to the present invention. An ultrasonic flowmeter 101 includes a first ultrasonic transducer 1 and a second ultrasonic transducer 2 that are arranged so as to form a propagation path for an ultrasonic wave in a flow path 12 of fluid, a transmission unit 3, and a reception unit 6.

Each of the first ultrasonic transducer 1 and the second ultrasonic transducer 2 functions as a transmitter and a receiver. An ultrasonic wave sent from the first ultrasonic transducer 1 is received by the second ultrasonic transducer 2, and an ultrasonic wave sent from the second ultrasonic transducer 2 is received by the first ultrasonic transducer 1. These propagation paths in two ways form an angle θ with respect to a direction in which fluid, which flows in the flow path 12, flows. A size of the angle θ is selected from a range of 10 to 40 degrees.

As the first ultrasonic transducer 1 and the second ultrasonic transducer 2, various ultrasonic transducers, which are driven at a frequency of about 20 kHz or more by an oscillation mode such as a thickness oscillation mode, a side slipping oscillation mode, or a longitudinal oscillation mode and are used as an ultrasonic flowmeter conventionally, can be used. An optimal frequency is selected appropriately according to a state and a type as well as an estimated flow velocity of fluid to be measured. In this embodiment, for example, an ultrasonic transducer, which oscillates in the thickness oscillation mode and has a resonance frequency of 200 kHz, is used.

The first ultrasonic transducer 1 and the second ultrasonic transducer 2 are connected to the reception unit 6 via a switching unit 10. The ultrasonic wave, which has reached the first ultrasonic transducer 1 or the second ultrasonic transducer 2, is converted into an electric signal, and a received signal is amplified by the reception unit 6. In the case in which the electric signal generated by the ultrasonic wave, which has reached the first ultrasonic transducer 1 or the second ultrasonic transducer 2, is sufficiently large, the reception unit 6 does not always have to amplify the received signal. The switching unit 10 may be mechanical unit such as a toggle switch or may be a unit constituted by an electronic unit or the like.

The received signal amplified by the reception unit 6 is sent to a zero-cross detection unit 7 and a wave number measurement unit 50. The wave number measurement unit 50 includes a peak hold unit 13, a differentiation unit 14, a waveform shaping unit 15, and a counter 16.

FIG. 2 shows signals in the respective unit in the wave number measurement unit 50. As shown in FIG. 2, the peak hold unit 13 holds a peak value of a received signal 18 and generates a peak hold signal 19. The peak hold signal 19 is inputted to the differential unit 14, and a differentiated signal 21 of the peak hold signal 19 is generated in the differentiation unit 14. The waveform shaping unit 15 receives the differentiated signal 21 and generates a digital signal 22. The counter 16 counts this digital signal 22, and when the count has reached a predetermined count value, outputs a zero-cross instruction signal to the zero-cross detection unit 7.

Immediately after receiving the zero-cross instruction signal, the zero-cross detection unit 7 detects a point where amplitude of the received signal 18 changes from positive to negative or from negative to positive as a zero-cross point and outputs the zero-cross detection signal to a delay unit 4. This zero-cross point is assumed to be a propagation time of the received signal.

The delay unit 4 generates a trigger signal at timing delayed by predetermined time on the basis of the zero-cross detection signal. A repetition unit 8 counts an output signal of the delay unit 4, and if the count is equal to or less than a predetermined number of times, outputs the output of the delay unit 4 to the transmission unit 3. The transmission unit 3 drives the first ultrasonic transducer 1 or the second ultrasonic transducer 2 on the basis of the trigger signal.

A timing unit 9 measures a time required for repeating a loop of the above-described transmission and reception by a predetermined number of times and sends a result of the measurement to a flow volume calculation unit 11.

The ultrasonic flowmeter 101 of this embodiment includes a correction unit 51 that reduces an error of zero-cross detection that is caused by noise included in a received signal received by an ultrasonic transducer. The correction unit 51 will be hereinafter explained in detail.

Figure 3:
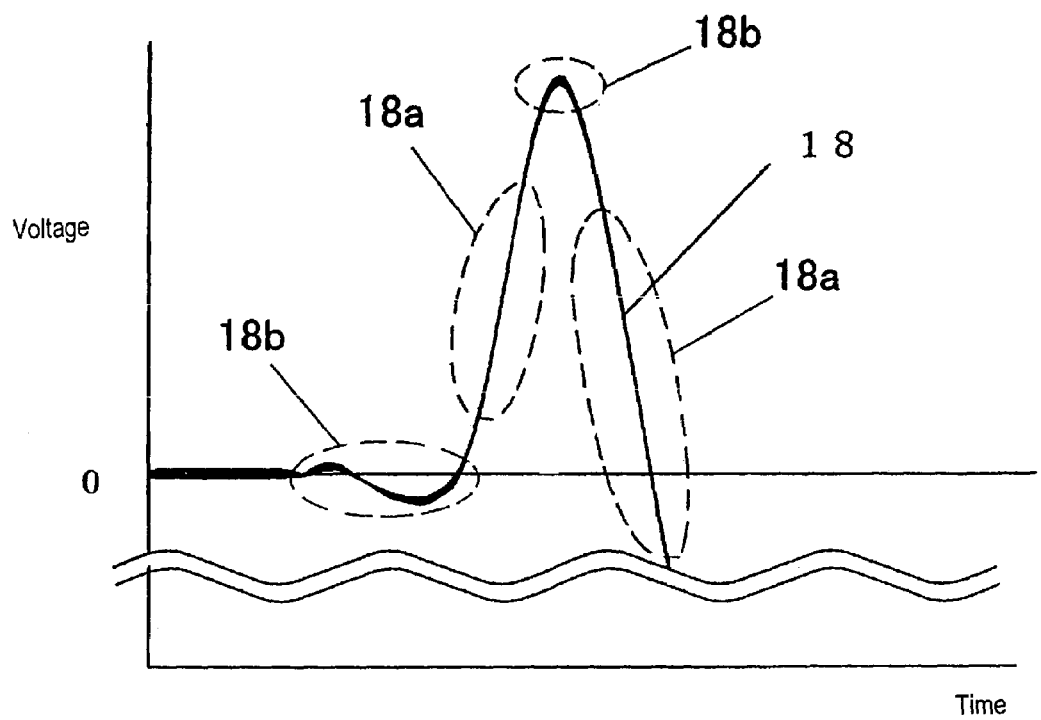
FIG. 3 is a diagram showing an ultrasonic received signal on which noise is superimposed.
Figure 4:
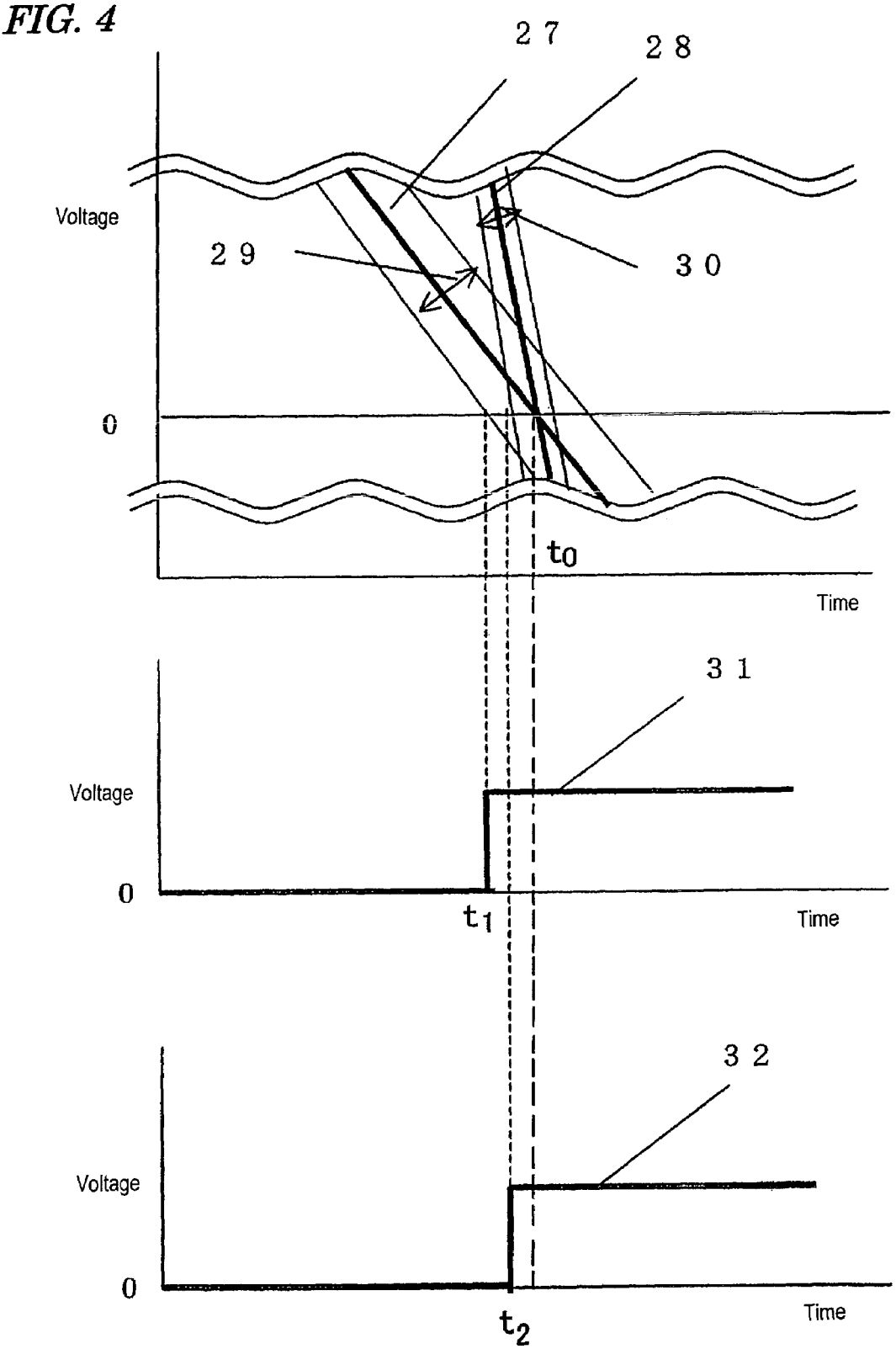
FIG. 4 is a diagram showing a difference of an influence of noise, which is caused by a difference in an inclination of an ultrasonic received signal, and a shift of a zero-cross point.

First, a reason why an error is caused in the zero-cross detection by noise will be explained. FIG. 3 shows a waveform obtained by measuring and overwriting the received signal 18, on which noise is superimposed, plural times. As shown in FIG. 3, it is seen that a part 18*a* where an inclination of a waveform of the received signal 18 is large and a part 18*b* where the inclination is small are affected by the noise differently. If it is assumed that a frequency of the received signal 18 does not change, as shown in FIG. 4, an inclination near an origin of a wave 28 with a large amplitude of the received signal 18 is relatively large, and an inclination near an origin of a wave 27 with a small amplitude is relatively small. Therefore, the wave 27 and the wave 28 are affected by the noise differently. When it is considered that a width in a vertical direction of curves (straight lines) of the wave 27 and the wave 28 is a noise level, a large, and a noise level 30 of the wave 28 with the large inclination is small.

Consequently, even if the wave 27 and the wave 28, on which the noise is not superimposed, cross the origin at the same time t0, in the case in which the noise is superimposed on the wave 27 and the wave 28, the wave 27 and the wave 28, on which the noise is superimposed, cross the origin at different times. As shown in FIG. 4, whereas the wave 27 crosses the origin at a time t1, the wave 28 crosses the origin at a time t2. The fact that the wave 27 and the wave 28, on which the noise is not superimposed, cross the origin at the same time t0 means that magnitudes of amplitudes of the wave 27 and the wave 28 are different but frequencies thereof are the same. Therefore, in the case in which the noise is superimposed on the received signal 18, even if frequencies of signals are the same, since amplitudes thereof are different, a zero-cross point changes.

As a result, as shown in FIG. 4, in the case of the wave 27 with the small amplitude of the received signal 18, a zero-cross detection signal 31 is generated, and in the case of the wave 28 with the large amplitude of the received signal 18, a zero-cross detection signal 32 is generated. The zero-cross detection signal 31 and the zero-cross detection signal 32 are not the same, which causes an error in measurement.

Figure 5:
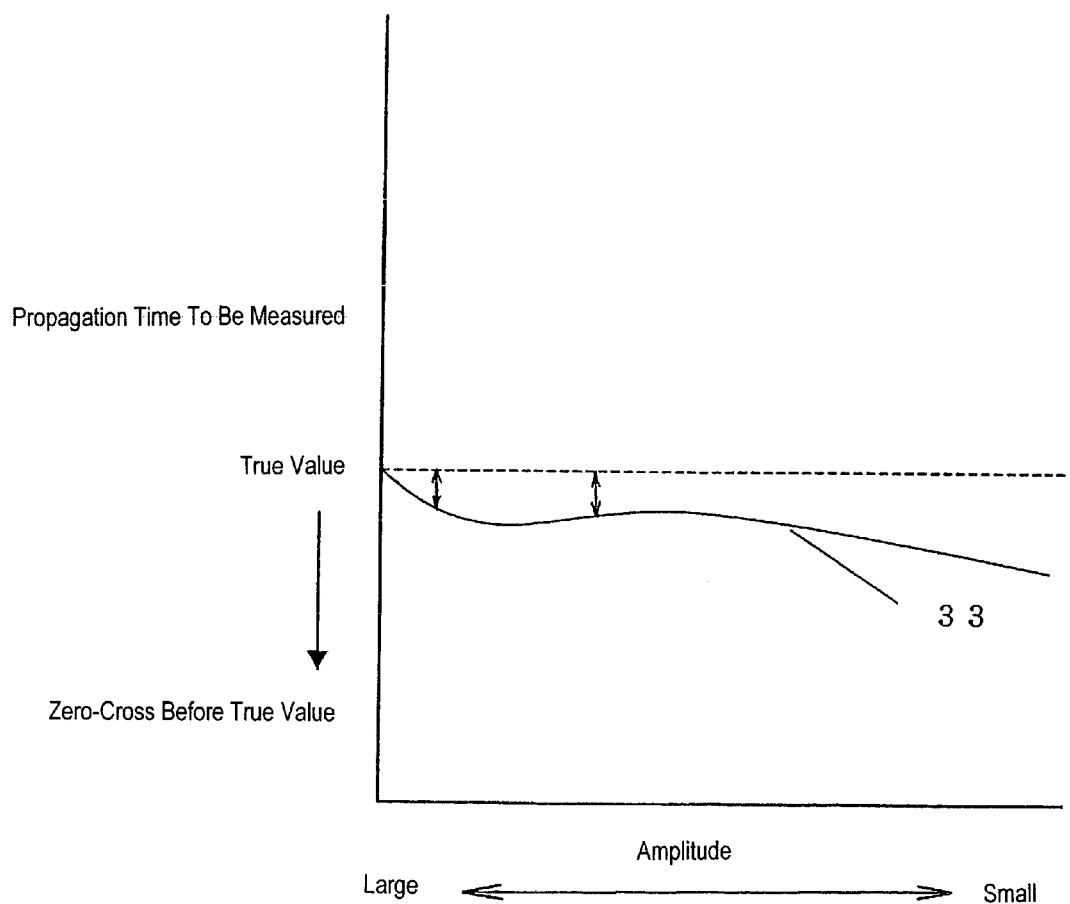
FIG. 5 is a graph showing a relation between a magnitude

FIG. 5 is a graph showing a relation between a magnitude of amplitude and a propagation time in the case in which the noise is superimposed on the received signal 18. In FIG. 5, the horizontal axis indicates a relative magnitude of amplitude, and the vertical axis indicates a relative time of a zero-cross point. Since it is assumed that a received wave has reached an ultrasonic transducer on a reception side at the zero-cross point, the vertical axis indicates a propagation time. In the graph of FIG. 5, a zero-cross point is measured at a falling edge of a signal (a point where a signal changes from positive to negative). A true value indicated by a dotted line means a zero-cross point of the received signal 18 on which noise is not superimposed. In the case in which noise is not superimposed on the received signal 18, a propagation time does not change even if amplitude changes.

As described in detail with reference to FIG. 4, in the case in which a zero-cross point is detected at a falling edge of a signal, by superimposing noise on the received signal 18, a propagation time becomes earlier than the true value. In addition, as amplitude of the received signal 18 is larger, the propagation time becomes closer to the true value. Although deviation from the true value increases as the amplitude decreases, a change in the deviation decreases when the amplitude decreases to a certain degree.

In the ultrasonic flowmeter of this embodiment, a relation between a magnitude of amplitude and a propagation time of a received signal is found in advance as shown in FIG. 5, and a flow volume is corrected on the basis of this relation. The correction unit 51 for this purpose, which reduces an error of the zero-cross detection caused by noise, will be hereinafter explained more specifically.

As shown in FIG. 1, the correction unit 51, which reduces an error of the zero-cross detection caused by noise, includes a level detection unit 5, a level storage unit 7, and a flow volume correction data storage unit 52. A level detection unit 5 receives a peak hold signal to be outputted from the peak hold unit 13 and a zero-cross detection signal to be outputted from the zero-cross detection unit 7 and outputs amplitude of a wave of a received signal at the time when the zero-cross detection is performed to the level storage unit 17. The level storage unit 17 stores a magnitude of amplitude of the wave at the time when the zero-cross detection for the received signal is performed.

In addition, data indicating a relation between a magnitude of amplitude of a wave and a propagation time at the time when the zero-cross detection for the received signal as shown in FIG. 5 is stored in the correction data storage unit 52.

The flow volume calculation unit 11 receives data concerning the time required for repeating the loop of transmission and reception outputted from the timing unit 9 (time required for the sing around), data concerning the magnitude of the amplitude of the wave, at the time when the outputted from the level storage unit 17, and data indicating the relation between the magnitude of the amplitude and the propagation time of the received signal outputted from the correction data storage unit 52, corrects the propagation time according to the amplitude of the wave at the time when the zero-cross detection for each received signal is performed, and calculates a flow velocity and a flow volume.

In this embodiment, the above-described respective components can also be constituted by hardware using an electronic part and the like or can also be constituted by software. The flow volume calculation unit 11 is realized by a microcomputer or the like. This microcomputer also performs control of the respective components. In the case in which the functions of the above-described respective components are realized by software, the respective components may be called with the word "unit" replaced with the word "step" as in a "peak hold step", a "differentiation step", and the like. It is possible to realize the functions by either hardware or software. As long as the functions of the respective components can be realized, a constitution for realizing the functions is not limited. Thus, the respective components may be called with the word "unit" replaced with the word "means" as in "peak hold means", "differentiating means", and the like. In embodiments described below, it is also possible to constitute the respective components in the same manner and refer to the respective components.

Next, a procedure for measuring a flow volume of fluid using the ultrasonic flowmeter 10 will be explained. A procedure to be explained below is performed by sequentially controlling the respective components with a computer such as a microcomputer. A program for causing the computer to execute the procedure is saved in information recording medium such as a ROM, a RAM, a hard disk, or a magnetic recording medium.

First, as shown in FIG. 1, the switching unit 10 is used to connect the transmission unit 3 to the first ultrasonic transducer 1 and connect the reception unit 6 to the second ultrasonic transducer 2 using the switching unit 10.

Figure 6:
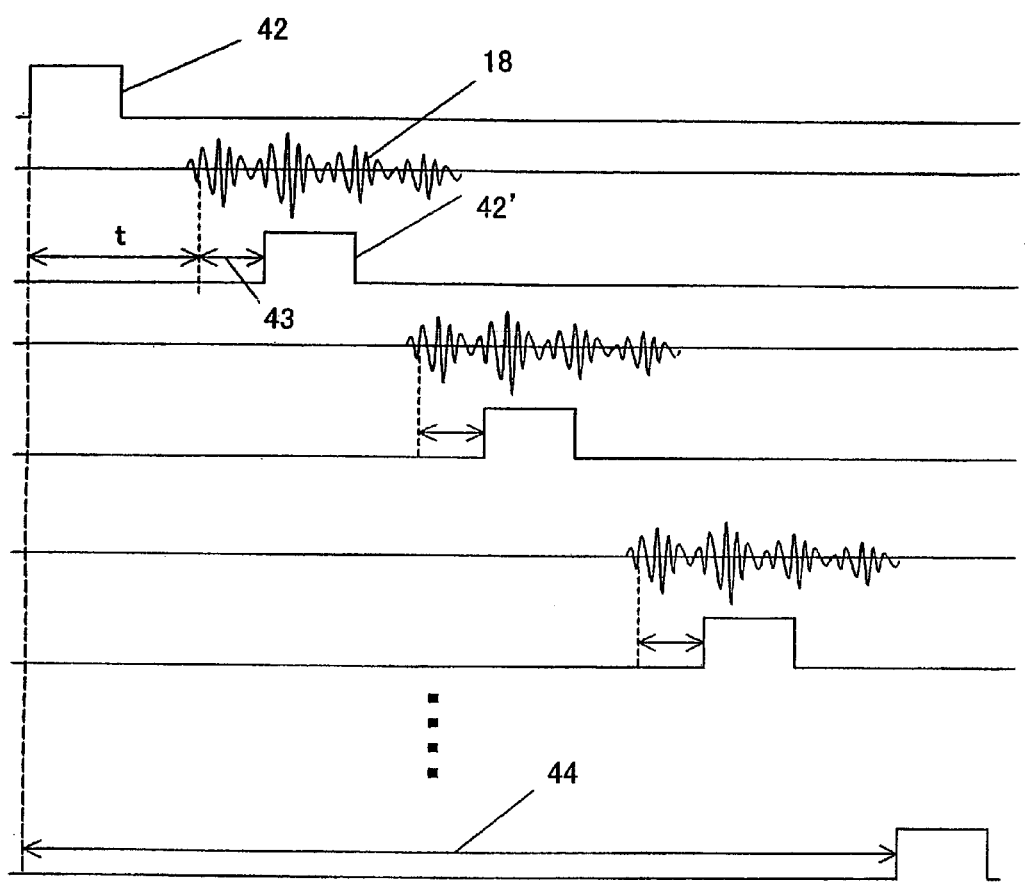
FIG. 6 is a diagram illustrating measurement with a sing around method.

As shown in FIG. 6, a trigger signal 42 is inputted to the first ultrasonic transducer 1 to generate an ultrasonic wave. The ultrasonic wave, which is propagated through the flow path 12, is received by the second ultrasonic transducer 2 and detected as the received signal 18 by the reception unit 6.

A wave number of the received signal 18 is counted by the peak hold unit 13, the differentiation unit 14, the waveform shaping unit 15, and the counter 16, and a zero-cross point immediately after the wave number has reached a predetermined wave number is detected by the zero-cross detection unit 7. After a predetermined delay time 43 has elapsed, the delay unit 4 outputs a trigger signal 42' to the transmission unit 3 on the basis of a zero-cross detection signal outputted from the zero-cross detection unit 7. Consequently, one loop of a sing around is constituted. After the loop of transmission and reception is repeated a predetermined number of times (e.g., 50 to 1000 times), the timing unit 9 measures a total time 44 required for repeating the loop and sends a result of the measurement to the flow volume calculation unit 11. The level detection unit 5 measure amplitude of a wave subjected to the zero-cross detection (hereinafter referred to as zero-cross detection wave) of each received signal 18 and stores a value of the amplitude in the level storage unit 17.

A relation between a magnitude of an amplification and a propagation time of a received signal indicated by a curve 33 in FIG. 5 is found in advance and stored in the correction data storage unit 52. These data can be acquired from the zero-cross detection unit 7 and the level storage unit 17 according to the above-described procedure by sending and receiving ultrasonic waves of various magnitude of amplifications using the ultrasonic flowmeter 20.

In the flow volume calculation unit 11, the total time 44 shown in FIG. 6 is corrected by performing correction of a propagation time according to a magnitude of amplitude of each zero-cross detection wave, which is outputted from the level storage unit 17, using a relation between a magnitude of amplitude and a propagation time of a zero-cross detection wave obtained from the correction data storage unit 31. A value obtained by dividing the corrected total time 44 by the number of times of sing around and subtracting the delay time 43 from a value of the quotient is t1 shown in formula (1).

Next, the switching unit 10 is used to connect the transmission unit 3 to the second ultrasonic transducer 2 and connect the reception unit 6 to the first ultrasonic transducer 1. Then, according to the same procedure as the above-described procedure, an ultrasonic wave is generated from the second ultrasonic transducer 2, and the ultrasonic wave is received by the first ultrasonic transducer 1. After the loop of transmission and reception is repeated a predetermined number of times, the timing unit 9 times the total time 44 required for repeating the loop and sends a result of the measurement to the flow volume calculation unit 11. The total time 44 is corrected as described above using data obtained from the level storage unit 17 and the correction data storage unit 31. Then, a value obtained by dividing the corrected total time 44 by the number of times of sing around and subtracting the delay time 43 from a value of the quotient is t2 shown in formula (1).

A flow velocity V of fluid is determined by substituting the values of t1 and t2 and the angle θ in formula (2). Moreover, when it is assumed that a sectional area of the flow path 12 is S, a flow volume Q can be calculated by V×S. This flow volume Q is an amount of movement of the fluid in a unit time, and a quantity of the fluid can be calculated by integrating the flow volume Q.

In this way, according to this embodiment, a wave number of a received signal is measured by the wave number measurement unit. Consequently, even if amplitude of each wave of the received signal is irregular because a flow of the fluid is disrupted, a wave that should be subjected to the zero-cross detection can be specified surely. In addition, since an influence of noise can be reduced by the correction unit 51, a measurement error due to fluctuation of the amplitude of the received signal can be reduced to perform highly accurate measurement.

Note that, in the ultrasonic flowmeter 101 shown in FIG. 1, a relation between a wave subjected to the zero-cross detection and a propagation time of a received signal obtained from the correction data storage unit 31 is use to correct a propagation time of each received wave according to a magnitude of amplitude of a zero-cross detection wave outputted from the level storage unit 17. In other words, the total time 44 is corrected on the basis of a magnitude of amplitude of a wave at the time when a zero-cross point of each received signal is generated. However, an average of magnitudes of amplitudes of waves subjected to the zero-cross detection of all received signals may be calculated to perform the correction on the basis of the average value.

Figure 7:
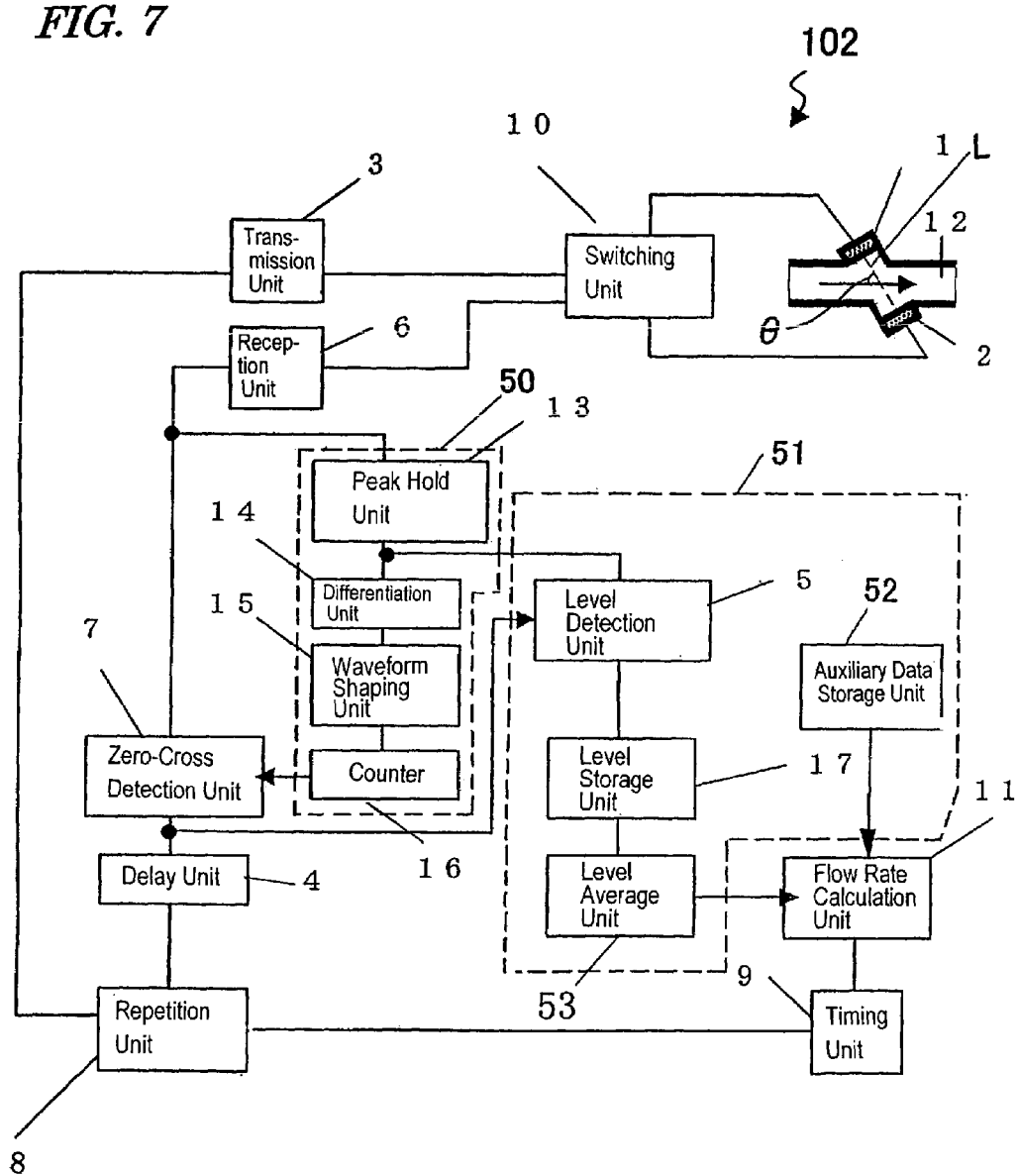
FIG. 7 is a block diagram showing a modified example of the first embodiment.

In an ultrasonic flowmeter 102 shown in FIG. 7, the correction unit 51 includes a level average unit 53 that receives data concerning magnitudes of amplitudes of plural waves, at the time when a zero-cross point is generated, stored in the level storage unit 17 and calculates an average of those values. The level average unit 53 outputs the average value to the flow volume calculation unit 11. The number of data, for which an average is calculated, can be set arbitrarily. For example, the level average unit 53 calculates an average value of magnitudes of amplitudes of zero-cross detection wave for the total number of times of sing around. Then, the relation between a magnitude of amplitude and a propagation time obtained from the correction data storage unit 31 may be used to correct a propagation time according to the average value obtained from the level average unit 53 and multiply the corrected value by the number of times of sing around to obtain the total time 44.

EMBODIMENT 2

Figure 8:
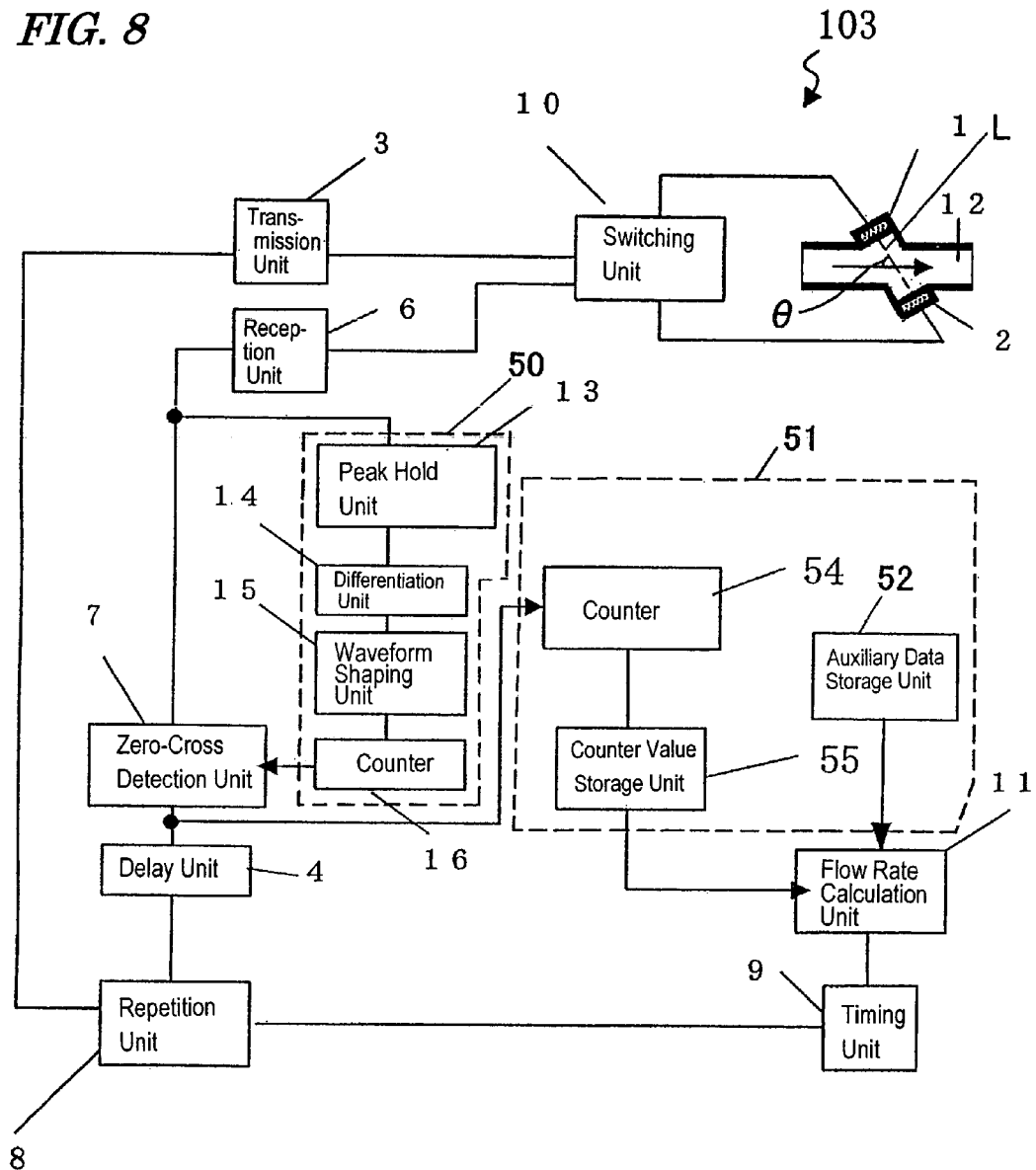
FIG. 8 is a block diagram showing a second embodiment of the ultrasonic flowmeter of the present invention.

FIG. 8 is a block diagram showing a second embodiment of the ultrasonic flowmeter according to the present invention. The ultrasonic flowmeter 103 is different from the first embodiment in that the ultrasonic flowmeter 103 includes the correction unit 51 that calculates the number of chatterings of a comparator for calculating a zero-cross point in the zero-cross detection unit 7 and reduces an error of zero-cross detection caused by noise from the number of chatterings.

As shown in FIG. 8, the correction unit 51 includes a counter 54 that receives an output value of a zero-cross comparator of the zero-cross detection unit 7 and measures the number of pulses included in the output and a counter value storage unit 55 that stores a counter value found by the counter 54. As shown in FIGS. 9(a) and (b), usually, the zero-cross detection unit 7 uses the zero-cross comparator to detect a zero-cross point of a zero-cross detection wave on which noise is superimposed. More specifically, as indicated by time t1 in FIG. 9(a) and time t2 in FIG. 9(b), when the zero-cross detection wave, on which noise is superimposed, crosses the origin for the first time, a zero-cross detection signal is generated. In this embodiment, an output of this zero-cross comparator is inputted to the counter 54 to measure a zero-cross point generated by the zero-cross detection wave after the first zero-cross point.

In the case in which noise is not superimposed on a zero-cross detection wave, there is only one zero-cross point originally. However, in the case in which noise is superimposed on a zero-cross detection wave, plural zero-cross points due to the superimposed noise are generated according to an inclination of the zero-cross detection wave. The number of zero-cross points to be generated increases as the inclination of the zero-cross detection wave decreases. The plural zero-cross points caused by the noise equal to the number of chatterings due to the noise in the zero-cross comparator. In other words, the number of chatterings due to the noise has a correlation with the inclination of the zero-cross detection wave. In addition, as explained in the first embodiment in detail, there is a correlation between the inclination of the zero-cross detection wave and an error between a propagation time of the zero-cross detection wave and a true value thereof. Therefore, there is a correlation between the number of chatterings in the zero-cross comparator and the propagation time of the zero-cross detection wave. Therefore, the number of cross-points, which is this number of chatterings, is measured by the counter 54, the value is stored in the counter value storage unit 55, and after repetition of a loop of transmission and reception of a predetermined number of times ends, when a flow velocity and a flow volume are calculated from a total time of sing around, the propagation time of the zero-cross detection wave is corrected on the basis of the number of chatterings stored in the counter 54; whereby the error due to the noise can be reduced.

Figure 10:
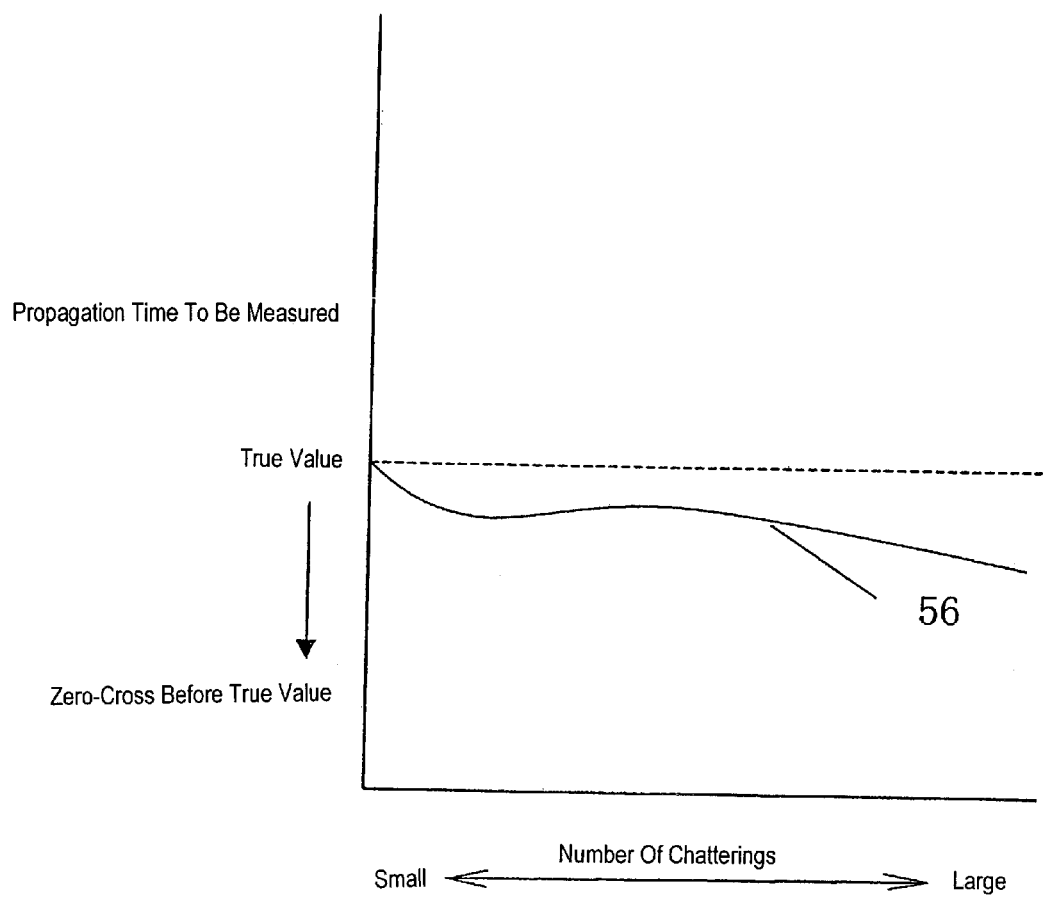
FIG. 10 is a graph showing a relation between the number of chatterings and a propagation time.

FIG. 10 is a graph showing a relation between the number of chatterings measured by the counter 54 and a propagation time. Since an inclination of a zero-cross detection wave is larger and an influence of noise is less as the number of chatterings is smaller, an error of a propagation time from a true value becomes small. By using this relation, an error due to noise can be corrected.

In the case in which the ultrasonic flowmeter 103 is used to measure a flow volume, first, a relation of a curve 56 shown in FIG. 9 is found in advance and stored in the correction data storage unit 52. For example, it is also possible that the ultrasonic flowmeter 103 is used to receive ultrasonic waves of various amplitudes, and the number of chatterings generated by the zero-cross detection unit at that point and a propagation time are stored in the correction data storage unit 52.

Next, an ultrasonic wave is sent and received to measure a flow volume as in the first embodiment. Thereafter, in the flow volume calculation unit 11, an actual propagation time on each received wave is corrected according to a value outputted from the counter storage unit 55 using the relation between the number of chatterings and a propagation time obtained from the correction data storage unit 52, whereby the total time 44 shown in FIG. 6 is corrected.

In this way, according to this embodiment, since an influence of noise can be reduced by using the number of chatterings of the comparator at the time when the zero-cross detection is performed, a measurement error due to fluctuation of amplitude of a received signal can be reduced to perform highly accurate measurement.

EMBODIMENT 3

In the first and the second embodiments, a measurement error, which is caused because an influence of noise is different depending upon an inclination of a zero-cross detection wave, is corrected after measurement of a flow volume. An ultrasonic flowmeter measures a flow volume such that an error is reduced.

Figure 11:
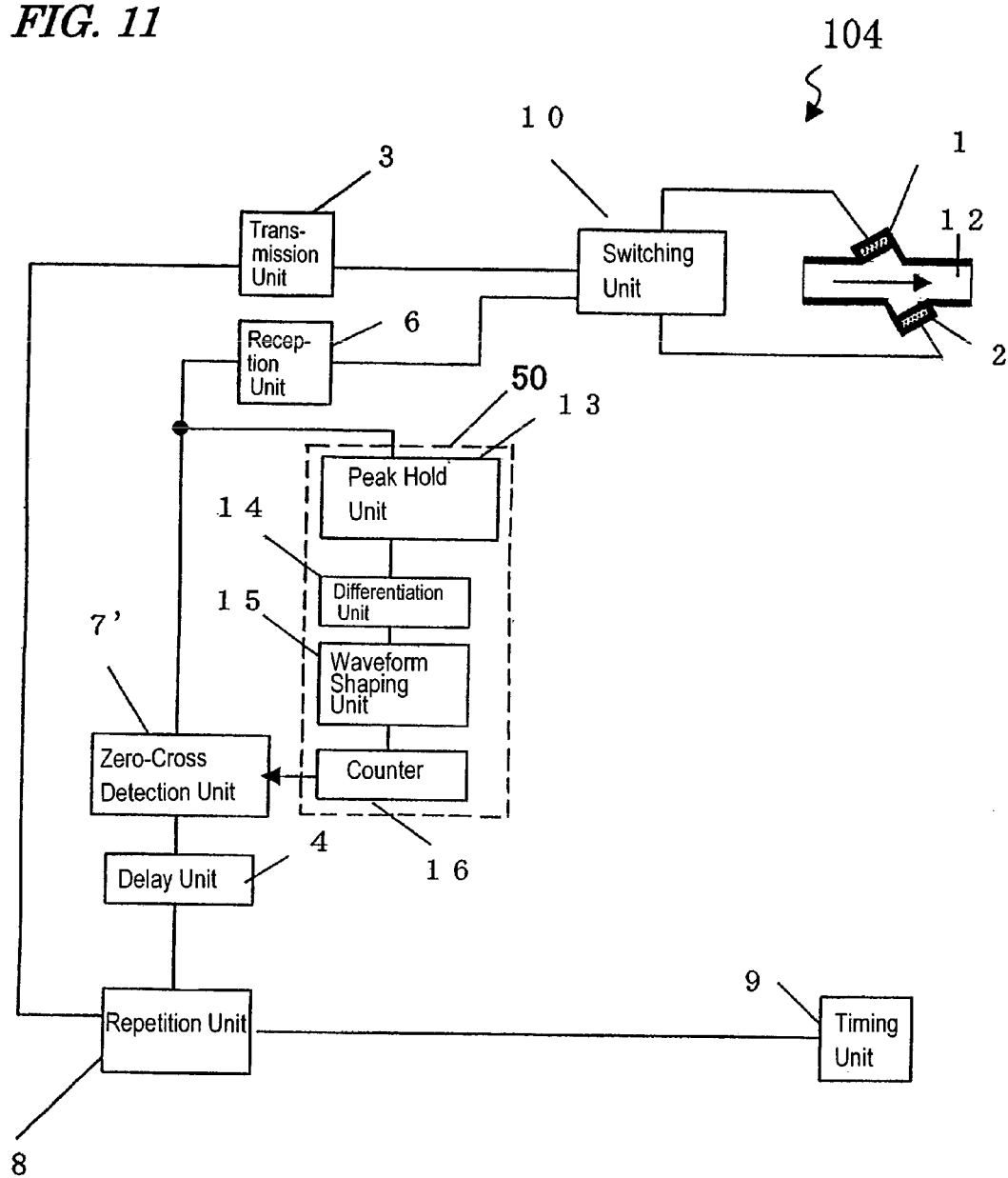
FIG. 11 is a block diagram showing a third embodiment of the ultrasonic flowmeter of the present invention.

FIG. 11 is a block diagram showing the second embodiment of the ultrasonic flowmeter according to the present invention. An ultrasonic flowmeter 104 is different from the first embodiment in that the ultrasonic flowmeter 104 does not include the correction unit 51 having the structure explained in the first embodiment but includes a zero-cross detection unit 7'.

In the first embodiment, the zero-cross detection unit 7 detects a point where a value of amplitude changes from positive to negative or negative to positive as a zero-cross point. In other words, zero is set as a reference. The zero-cross detection unit 7' of this embodiment offsets this reference and detects the reference as a zero-cross point. This offset reference becomes a correction unit. Note that, in the case in which the reference is offset from zero, a point where an offset reference value is crossed is not a "zero-cross point" in a strict sense. However, in this specification, the point where the offset reference value is crossed is also referred to as a "zero-cross point", and detection of a signal based upon the offset reference value is also called "zero-cross detection".

Figure 12:
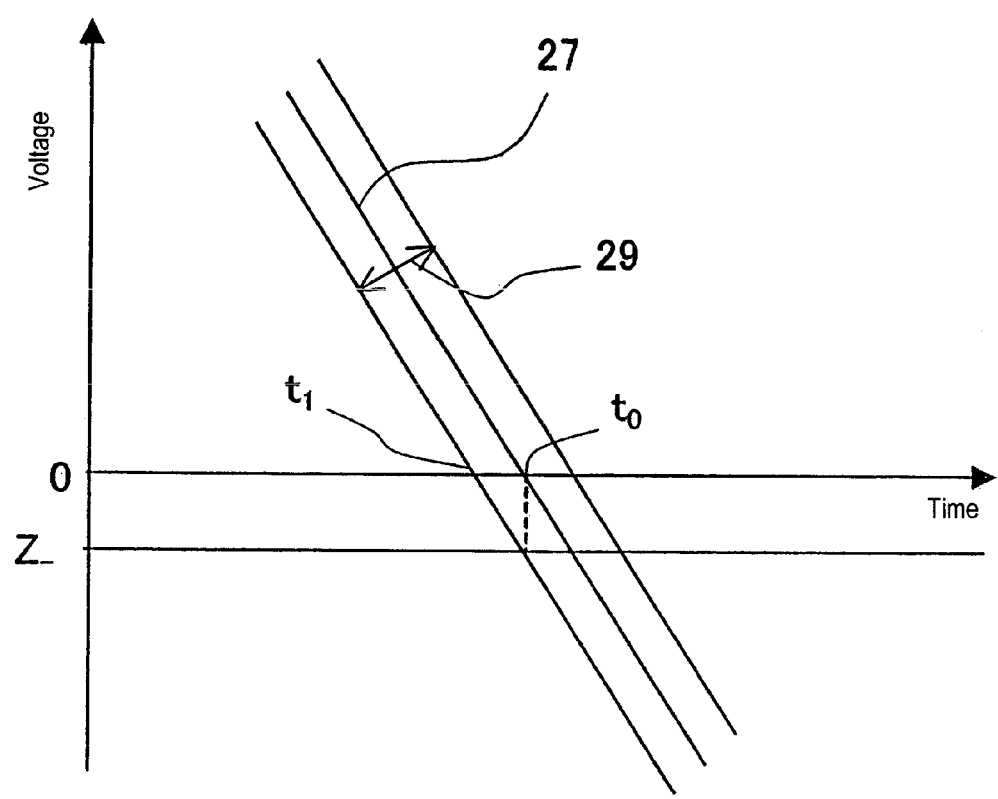
FIG. 12 is a diagram illustrating a shift of a zero-cross point due to noise in the case in which zero-cross detection is performed with a falling edge signal and a shift of a zero-cross point by offsetting a reference for detection.

As shown in FIG. 12, in the case in which noise is not superimposed on the zero-cross detection wave 27, a zero-cross point detected at a falling edge is time t0. However, in the case in which noise of the noise level 29 is superimposed on the zero-cross detection wave 27, a zero-cross point is time t1 that is earlier than the time t0. In this case, if a reference for detecting the zero-cross point is changed to Z-offset to a minus side from zero, even if noise is superimposed on the zero-cross detection wave 27, the zero-cross point is the time t0.

Figure 13:
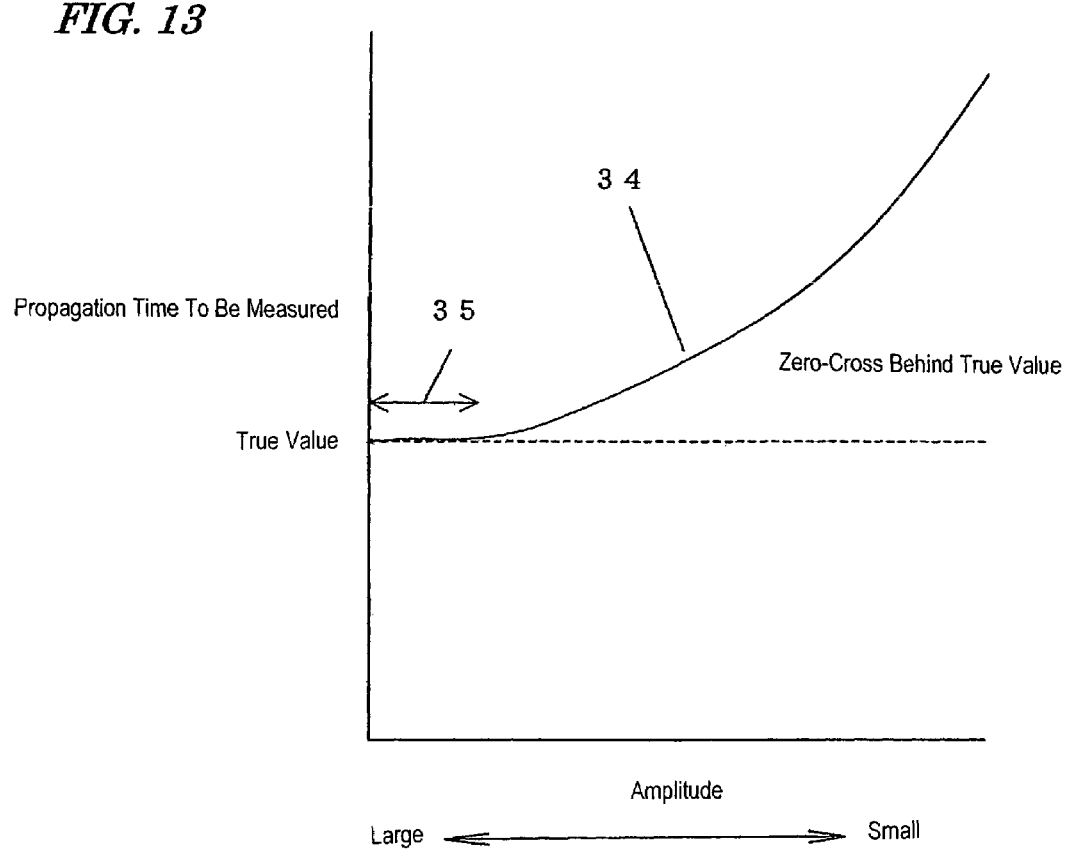
FIG. 13 is a graph showing a relation between a magnitude of amplitude and a propagation time in the case in which a reference for zero-cross detection is shifted.

FIG. 13 is a graph showing a relation between a magnitude of amplitude and a propagation time, which is a generation time for a zero-cross point, in the case in which a reference for zero-cross detection is offset to a minus side from zero. A true value is zero-cross generation time in the case in which noise is not superimposed on the zero-cross detection wave 27 and the reference for the zero-cross detection is set to zero. As shown in FIG. 13, in an area 35 where amplitude is large, a difference between the propagation time and the true value is very small. In addition, when amplitude decreases in an area away from the area 35, the propagation time becomes later than the true value. This indicates that, in the case in which the amplitude of the zero-cross detection wave is large, a measurement error is small, and it is unnecessary to perform flow volume correction. In addition, this indicates that, as the amplitude decreases, the propagation time is measured later than the true value.

To which degree a reference for detecting a zero-cross point is offset from zero can be set according to a magnitude of a noise level and an amount of change in amplitude of a zero-cross detection wave. For example, it is preferable to set the degree of offset to about 0.025% of a maximum amplitude value of the zero-cross detection wave. According to this embodiment, in particular, in the case in which amplitude of a zero-cross detection wave does not decrease much, means for correcting a flow volume can be provided to perform at least measurement with fewer errors.

In addition, in the case in which amplitude of a zero-cross detection wave decreases, the correction unit 51 explained in the first embodiment is provided in the ultrasonic flowmeter 104 of this embodiment, whereby measurement with much fewer errors can be performed. In this case, when amplitude of a received wave is large, since it is unnecessary to correct a flow volume, power consumption can be controlled so much more for that.

Figure 14:
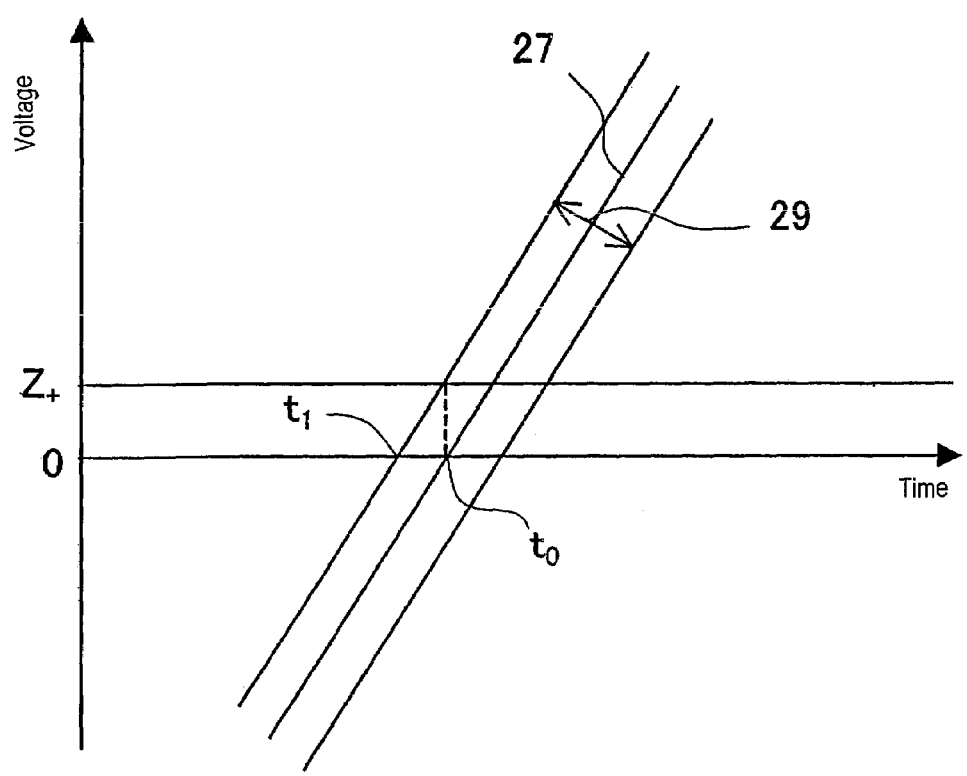
FIG. 14 is a diagram illustrating a shift of a zero-cross point due to noise in the case in which zero-cross detection is performed with a rising edge signal and a shift of a zero-cross point by offsetting a reference for detection.

Note that, in the above-described embodiments, the case in which the zero-cross detection is performed with a falling edge signal is explained. In the case in which the zero-cross detection is performed with the rising edge signal, as shown in FIG. 14, a reference for the zero-cross detection only has to be changed to Z+ that is offset to a plus side from zero.

In this way, according to this embodiment, the reference for performing the zero-cross detection is offset from zero, whereby a measurement error due to fluctuation in amplitude of a received signal can be reduced to perform highly accurate measurement.

EMBODIMENT 4

Figure 15:
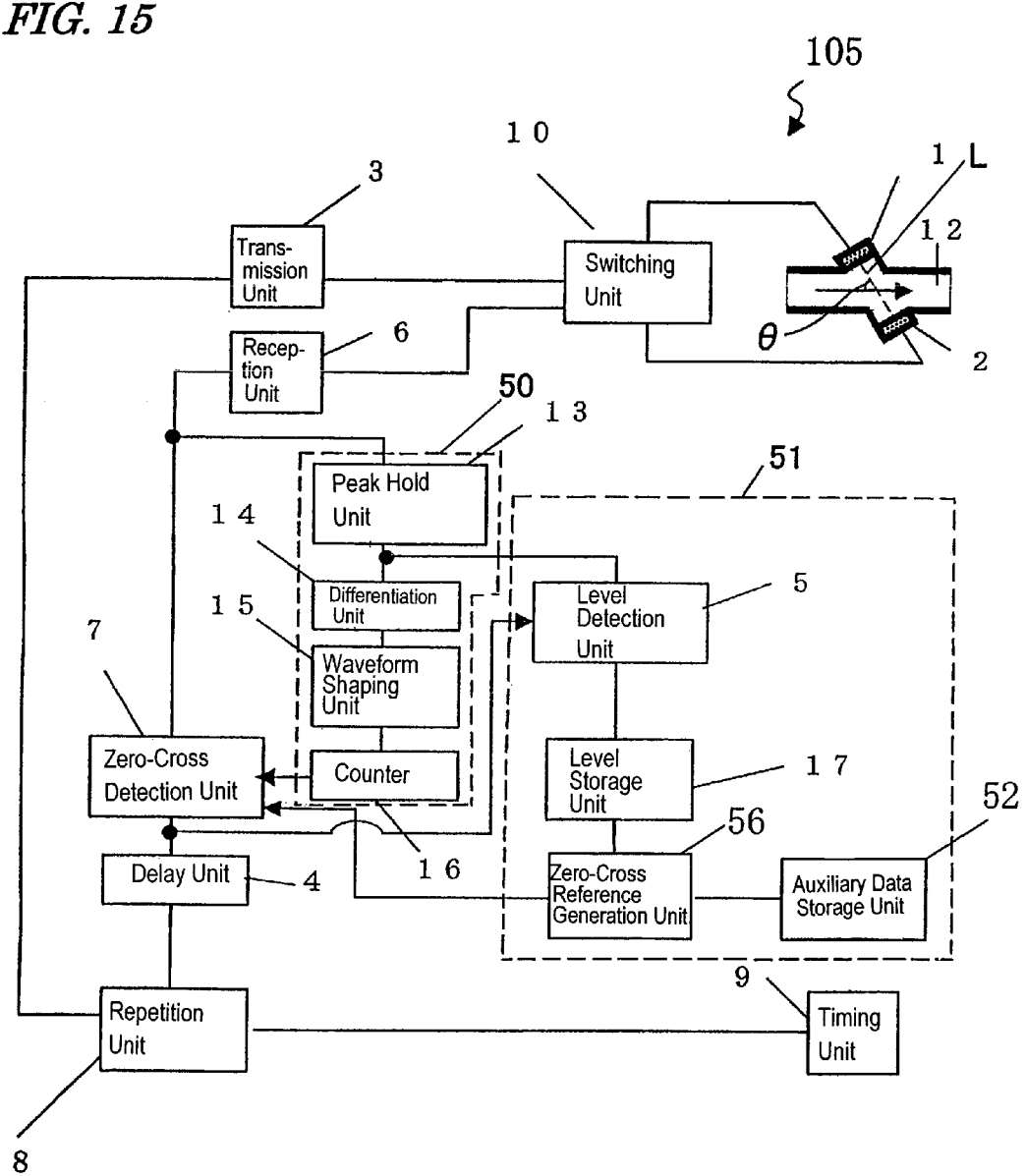
FIG. 15 is a block diagram showing a fourth embodiment of the ultrasonic flowmeter of the present invention.

FIG. 15 is a block diagram showing a fourth embodiment of the ultrasonic flowmeter according to the present invention. In the third embodiment, the reference for the zero-cross detection is fixed regardless of a magnitude of amplitude of a zero-cross detection wave. However, an ultrasonic flowmeter 105 of this embodiment changes a reference according to amplitude using the correction unit 51.

The correction unit 51 of the ultrasonic flowmeter 105 includes the level detection unit 5, the level storage unit 17, a zero-cross reference generation unit 56, and the correction data storage unit 52. The level detection unit 5 receives a peak hold signal outputted from the peak hold unit 13 and a zero-cross detection signal outputted from the zero-cross detection unit 7 and outputs to the level storage unit 17 a magnitude of a wave of a received signal at the time when zero-cross detection is performed. The level storage unit 17 stores the magnitude of the amplification of the received signal at the time when the zero-cross detection is performed.

Figure 16:
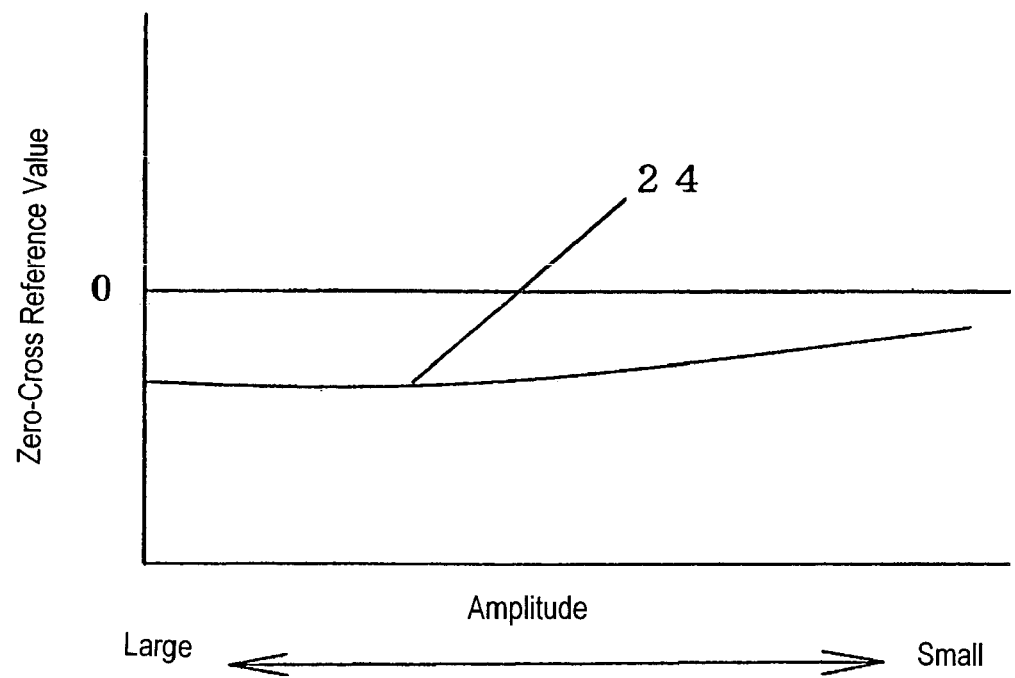
FIG. 16 is a graph showing a relation between amplitude and a zero-cross reference value.

As shown in FIG. 16, data of a curve 24 indicating a relation between amplitude of a zero-cross detection wave and a zero-cross reference value is stored in the correction data storage unit 52. This data can be acquired, for example, by finding a relation between amplitude and a propagation time of a received signal and calculating a reference value for zero-cross detection, with which a propagation time of a signal on which noise is superimposed is the same as a propagation time of a reference signal, for various amplitudes using a reference signal on which noise is not superimposed as in the first embodiment.

The zero-cross reference generation unit 56 receives amplitude of an immediately preceding zero-cross detection wave stored in the level storage unit 17 and generates a zero-cross reference value using the relation of the curve 24 from the data stored in the correction data storage unit 52. The generated zero-cross reference value is outputted to the zero-cross detection unit 7, and zero-cross detection for the next received wave is performed on the basis of a new zero-cross reference value received from the zero-cross reference generation unit 56. Usually, in continuous plural received waves, it can be assumed that amplitudes of adjacent two zero-cross reference value of the next received signal on the basis of amplitude of an immediately preceding received signal, measurement with fewer errors can be performed.

Figure 17:
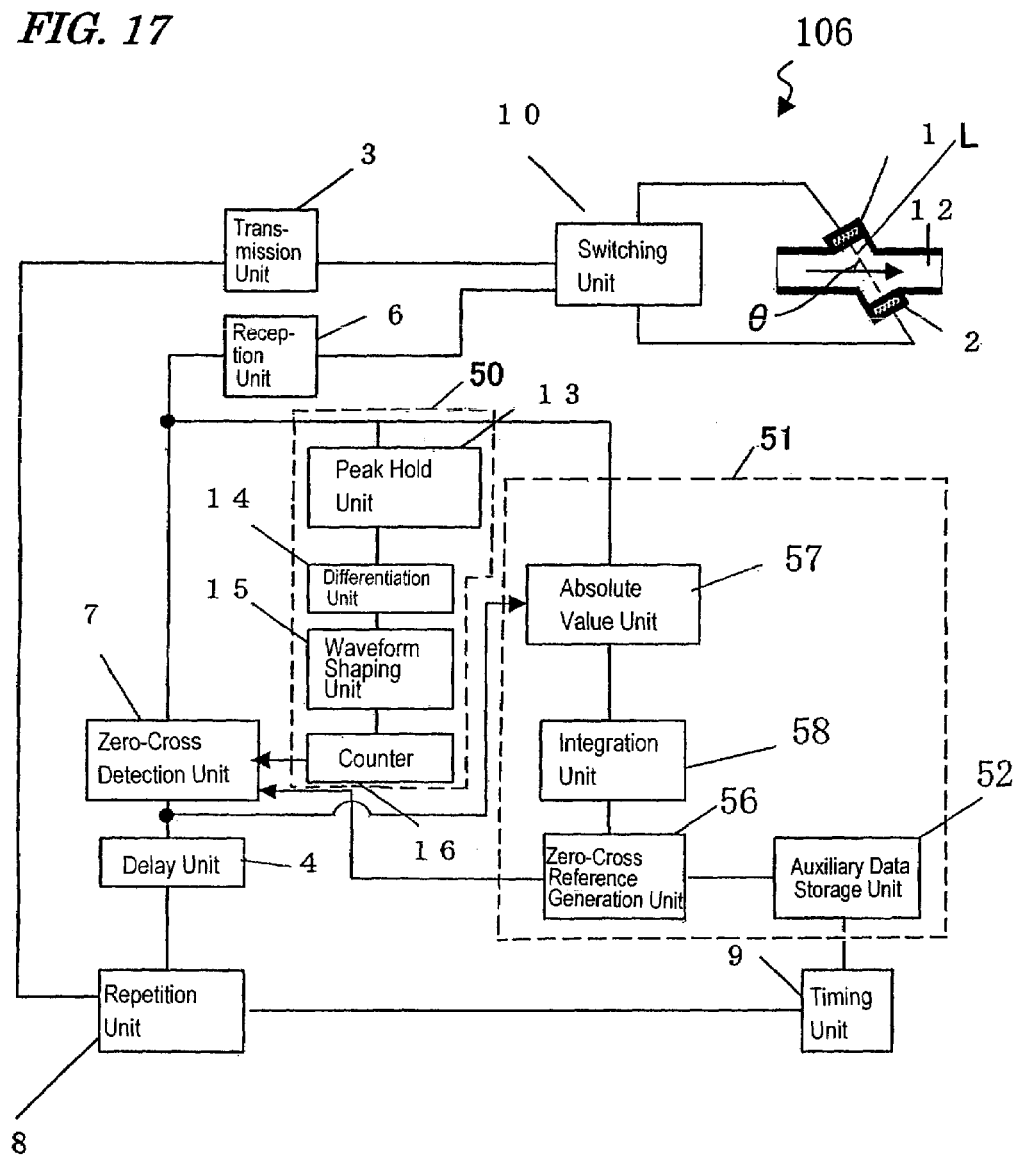
FIG. 17 is a block diagram showing a modified example of the fourth embodiment.
Figure 18:
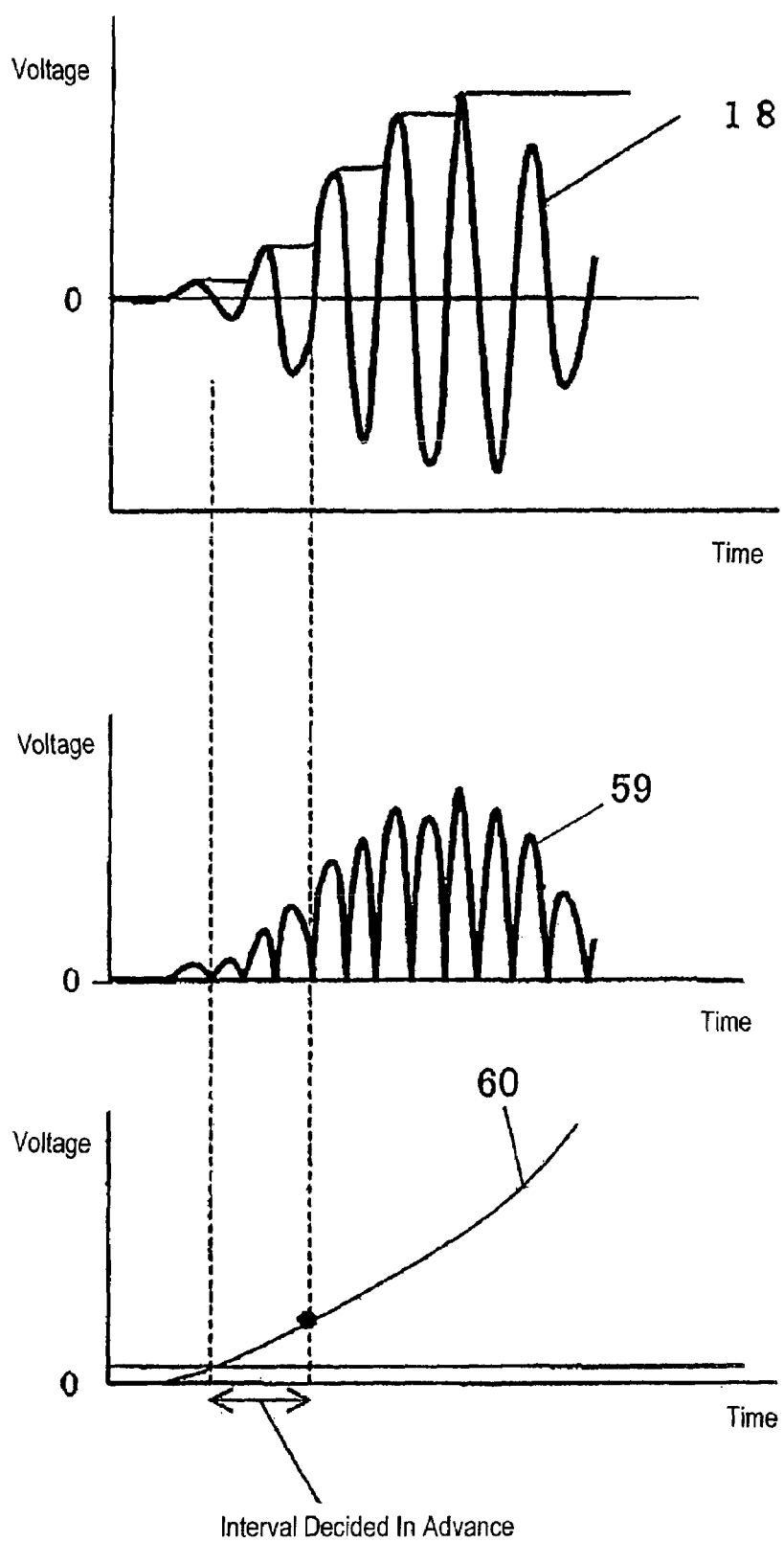
FIG. 18 is a diagram illustrating a signal that is generated in a correction unit of the ultrasonic flowmeter shown in FIG. 17.

In addition, amplitude of a zero-cross detection wave in a received signal has a correlation with a magnitude of a wave propagated before the zero-cross detection wave. Thus, by integrating a rising edge part of the received signal for a predetermined time, the amplitude of the zero-cross detection wave can be estimated. This may be used to change a zero-cross reference value. As shown in FIG. 17, the correction unit 51 of the ultrasonic flowmeter 106 includes an absolute value unit 57, an integration unit 58, the zero-cross reference value generation unit 56, and the correction data storage unit 52. As shown in FIG. 18, the absolute value unit 57 receives the received signal 18 and outputs an absolute value 59 thereof to the integration unit 58. The integration unit 58 integrates the absolute value 59 and outputs an integrated value after a predetermined time from the time when an integrated value 60 has exceeded a threshold value to the zero-cross reference value generation unit 56.

Data indicating a relation between an integrated value and a zero-cross reference value is stored in the correction data storage unit 52 in advance.

The zero-cross reference value generation unit 56 generates a zero-cross reference value corresponding to the integrated value outputted from the integration unit 58 using the data in the correction data storage unit 52 and outputs the zero-cross reference value to the zero-cross detection unit 7. The zero-cross unit 7 subjects a received wave after a predetermined wave number to zero-cross detection on the basis of this zero-cross reference value and on the basis of an output from the wave number measurement unit 50.

According to such a constitution, since a zero-cross reference value is determined according to a characteristic of a received signal itself to be measured, even if a waveform of a received wave is significantly different from an immediately preceding received wave, a measurement error can be reduced.

EMBODIMENT 5

Figure 19:
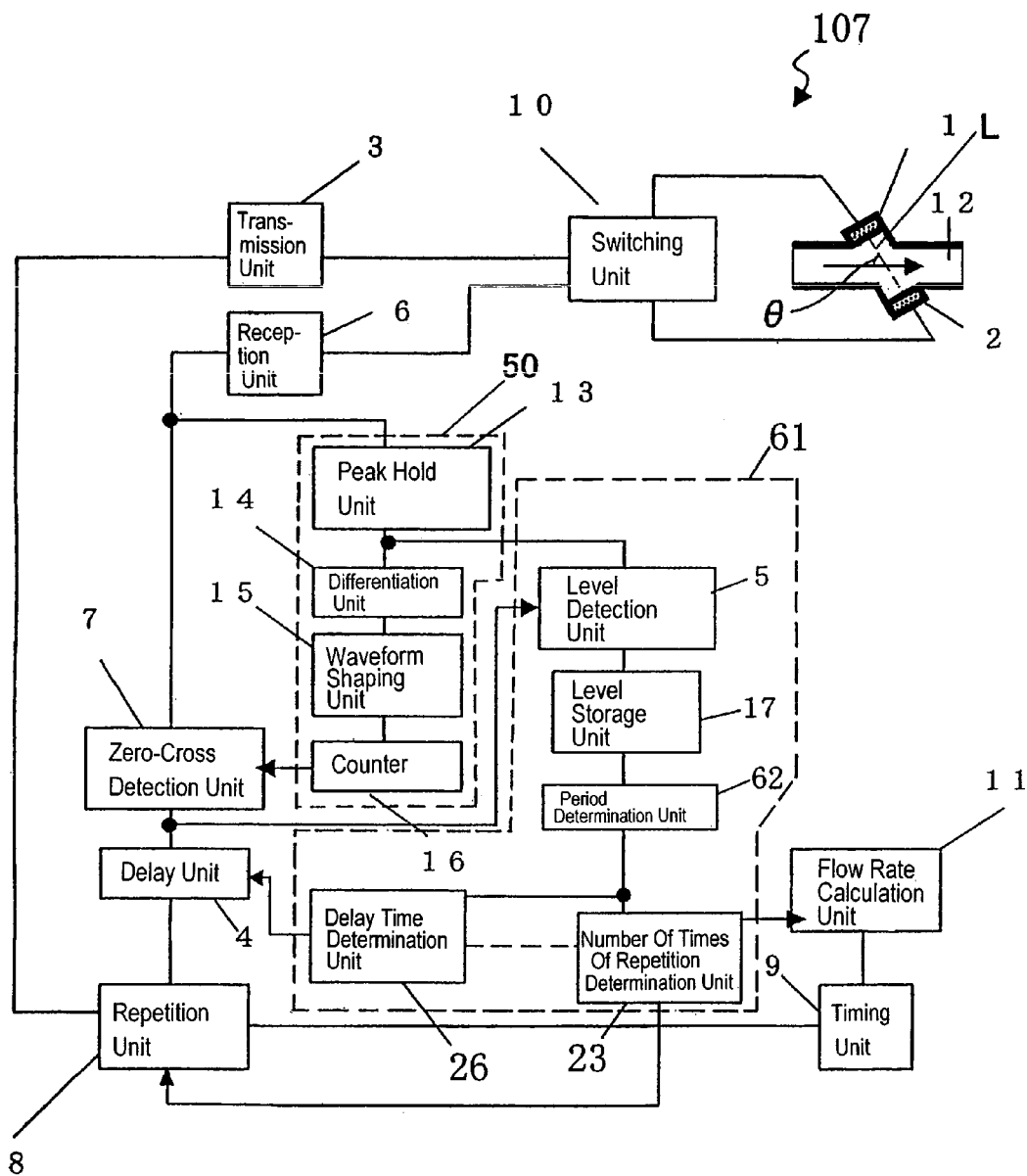
FIG. 19 is a block diagram showing a fifth embodiment of the ultrasonic flowmeter of the present invention.

FIG. 19 is a block diagram showing a fifth embodiment of the ultrasonic flowmeter according to the present invention. An ultrasonic flowmeter 107 is different from the ultrasonic flowmeter 101 of the first embodiment in that the ultrasonic flowmeter 107 includes a correction unit 61 for, in the case in which there is ripple in fluid flowing in a pipe, reducing a measurement error caused by the ripple. In order to know a period of the ripple, it is also possible to provide a pressure sensor in an ultrasonic flowmeter and measure pressure fluctuation with the pressure sensor to find a period of the ripple. However, it is difficult to set the pressure sensor for measuring ripple in completely the same place as an ultrasonic transducer for measuring an ultrasonic wave. Thus, setting conditions vary, and the pressure sensor cannot always detect an influence of ripple, to which the ultrasonic transducer for measuring an ultrasonic wave is subjected to, accurately. In addition, it is necessary to evaluate whether the pressure sensor is functioning normally. On the other hand, it is unnecessary to provide detecting means for detecting ripple in the ultrasonic flowmeter 107 anew. Therefore, such a problem does not occur.

As shown in FIG. 19, the correction unit 61 includes the level detection unit 5, the level storage unit 17, a number of times of repetition determination unit 23, a delay time determination unit 26, and a period determination unit 62. The level detection unit 5 receives a peak hold signal outputted from the peak hold unit 13 and a zero-cross detection signal outputted from the zero-cross detection unit 7 and outputs a magnitude of amplitude of a wave at the time when zero-cross detection for a received signal is performed to the level storage unit 17. The level storage unit 17 stores a magnitude of amplitude of each received signal at the time when zero-cross detection is performed.

Figure 20:
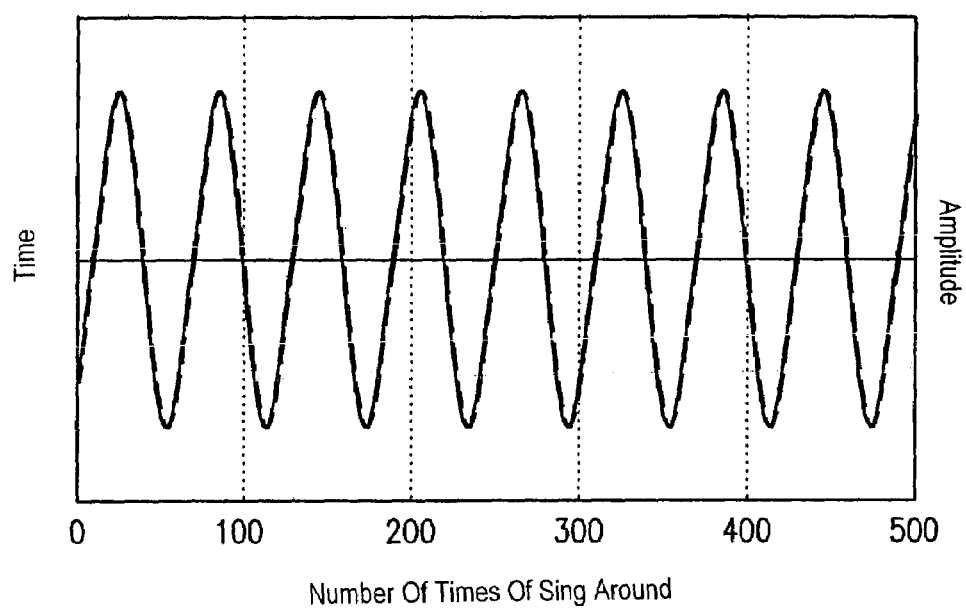
FIG. 20 is a diagram indicating that a transmission time of an ultrasonic wave and amplitude of a received signal change during sing around due to ripple of a flow velocity of fluid.

FIG. 20 shows a change in a propagation time of an ultrasonic wave, which is propagated between the ultrasonic transducers 1 and 2, at the time when a loop is repeated five hundred times (solid line) and a change in a maximum amplitude value included in a received signal of each loop (broken line) in the case in which a change in a flow velocity of fluid ripples. Since the propagation time of the ultrasonic wave, which is propagated between the ultrasonic transducers 1 and 2, is affected by the flow velocity of the fluid (formula (1)), the change in the propagation time is the same as a period of the ripple. On the other hand, amplitude of the ultrasonic wave, which is propagated between the ultrasonic transducers 1 and 2, is also affected by the flow velocity of the fluid, and in general, when the flow velocity increases, the amplitude decreases. Consequently, the amplitude of the ultrasonic wave changes in accordance with the period of the ripple. In addition, in the case in which the ultrasonic wave is sent repeatedly by the sing around method, a multiple reflection component of a propagated ultrasonic wave generated in flow path is received overlapping an ultrasonic wave sent next. Since the multiple reflection component and a propagation time of the ultrasonic wave to be sent next are affected by the flow velocity of the fluid as described above, amplitude of a received wave, which is a composition of the multiple reflection component and the ultrasonic wave sent next, also changes in accordance with the period of the ripple.

In this way, the magnitude of the amplitude of each received signal stored in the level storage unit 17 is affected by ripple and changes periodically. This period is same as the period of the ripple. Therefore, the period of the ripple can be calculated by calculating a period of fluctuation from the magnitude of the amplitude of each received signal stored in the level storage unit 17. Since the ripple has periodicity, in the case in which measurement of a flow volume is the same as this ripple period or is the same as two or more integer times as long as the period of the ripple, the influence of the ripple is cancelled.

More specifically, first, the period determination unit 62 calculates a period of ripple according to an auto-correlation method using the magnitude of the amplitude of each received signal stored in the level storage unit 17. Then, the number of times of a loop and/or a delay time in one sing around is determined by the number of times of repetition determination unit 23 and the delay time determination unit 26 such that the number of times of repetition of a loop and a delay time of transmission and reception, which are performed in the case in which an ultrasonic wave is propagated from one to the other of the first ultrasonic transducer 1 and the second ultrasonic transducer 2 to calculate a flow velocity, is the same as the period of the ripple calculated by the period determination unit 62 or an integer times as long as the period.

In the above-described ultrasonic flowmeter 107, the level detection unit 5 detects a magnitude of amplitude of a wave at the time when zero-cross detection is performed, whereby a period of ripple is calculated. However, a maximum amplitude included in a received signal of each loop may be used to calculate a period of ripple.

Figure 21:
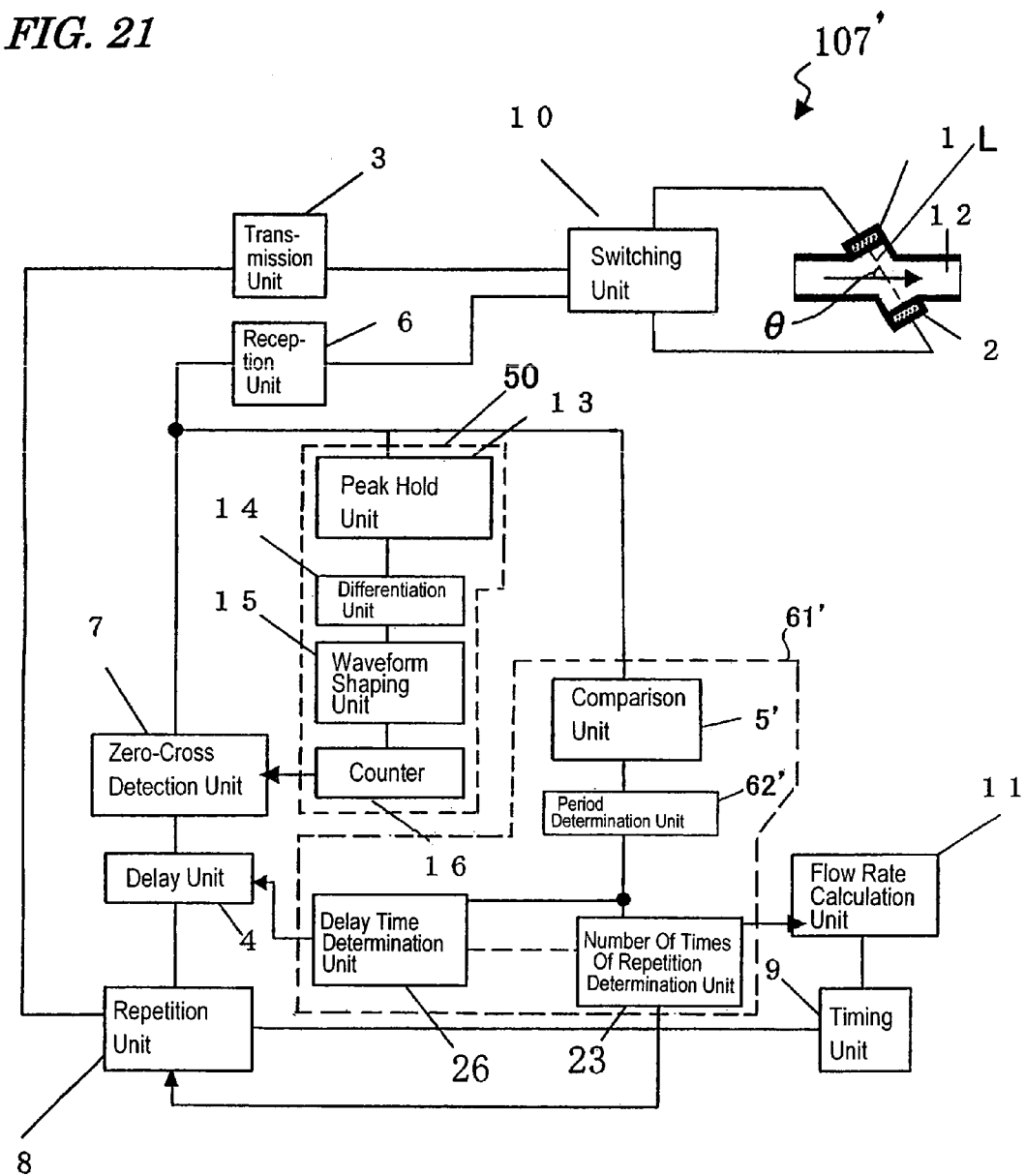
FIG. 21 is a block diagram showing another example of the fifth embodiment.
Figure 22:
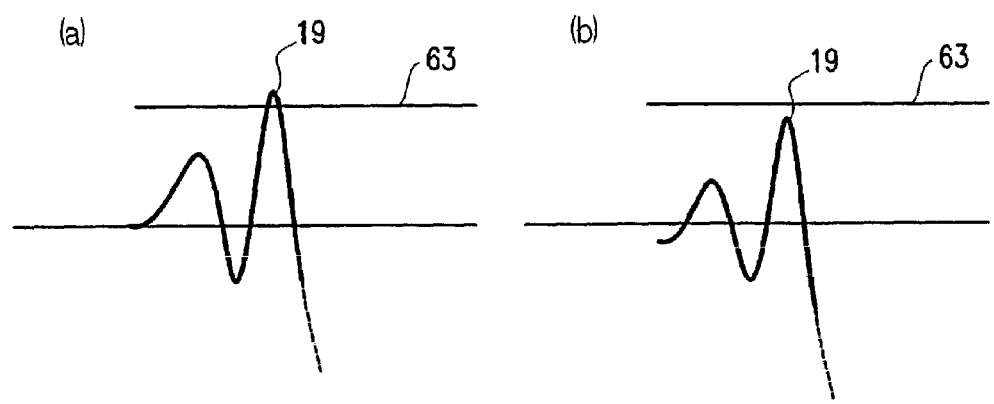
FIGS. 22(*a*) and (*b*) are diagrams illustrating a calculation that is performed in a comparison unit.

As shown in FIG. 21, an ultrasonic flowmeter 107' includes a correction unit 61'. The correction unit 61' includes a comparison unit 5', a period determination unit 62', the number of times of repetition determination unit 23, and the delay time determination unit 26. The comparison unit 5' receives a received signal outputted from the reception unit 6 and compares a predetermined threshold value 63 and amplitude of a received signal 19 as shown in FIG. 22(a). The threshold value 63 is set to a value that is smaller than a maximum which are received in a period of ripple, and is larger than a maximum amplitude value of at least one or more other received signals, which are received in the period of the ripple.

In the case in which the amplitude of the received signal 19 is larger as shown in FIG. 22(a), the comparison unit 5' outputs a logical value of a high level (ON) and maintains the value until comparison is performed next time. In the case in which the amplitude of the received signal 19 is smaller as shown in FIG. 22(b), the comparison unit 5' outputs a logical value of a low level (OFF).

The period determination unit 62 reads the output of the comparison unit 5' at predetermined timing. The reading timing only has to be shorter than a period of ripple to be calculated, and may be the same as a period of sing around or may be different from the period of sing around. In order to calculate a period of ripple accurately, it is preferable that the reading timing is equal to or shorter than ¹⁄₁₀ of the period of the ripple.

Figure 23:
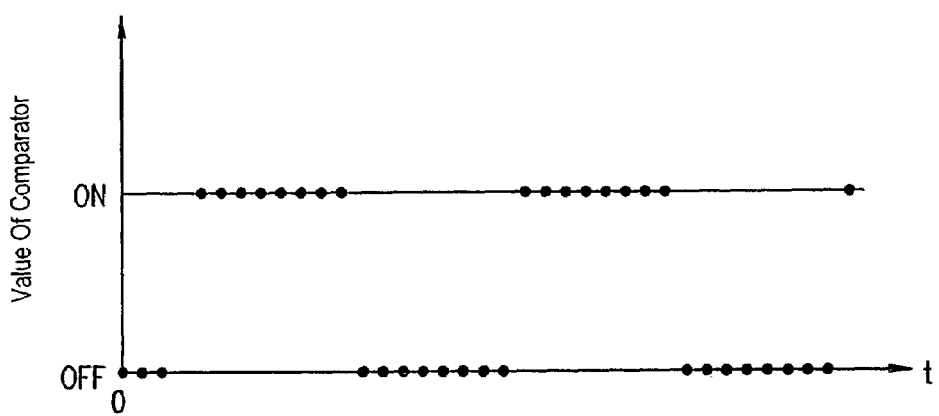
FIG. 23 is a diagram illustrating a procedure for calculating a period of ripple on the basis of an output from the comparison unit.

FIG. 23 shows the output of the comparison unit 5' that is read by the period determination unit 62 in this way. As shown in the figure, the output of the comparison unit 5' read at the predetermined timing shows periodicity. The period is the same as the period of the ripple. The period determination unit 62 calculates a period of ripple from the reading timing of the period determination unit 62 and the periodicity of the read data. For example, in the case in which the reading timing of the period determination unit 62 is 800 Hz, as shown in FIG. 23, since data of sixteen points constitutes one period, the period of the ripple is calculated as 50 Hz. The number of times of repetition determination unit 23 and the delay time determination unit 26 determine the number of times of a loop and/or a delay time in one sing around. In this way, according to this embodiment, a measurement error due to ripple of fluid can be reduced to perform highly accurate flow volume measurement. In particular, as shown in FIG. 20, the ultrasonic flowmeter of this embodiment calculates a period of ripple from periodicity of amplitude value of a received signal in one sing around. Thus, the ultrasonic flowmeter can determine a period of ripple every time the ultrasonic flowmeter calculates a flow velocity of fluid using formula (1) and formula (2) and can determine the number of times of a loop and/or a delay time of sing around such that an influence of the ripple can be reduced. Therefore, it is possible to reduce a measurement error due to ripple of fluid in a short time, and even in the case in which a period of ripple changes in a short time or in the case in which a period of ripple is short, a measurement error due to ripple of fluid can be reduced appropriately.

EMBODIMENT 6

A gas meter including the ultrasonic flowmeter of the present invention will be hereinafter explained.

Figure 24:
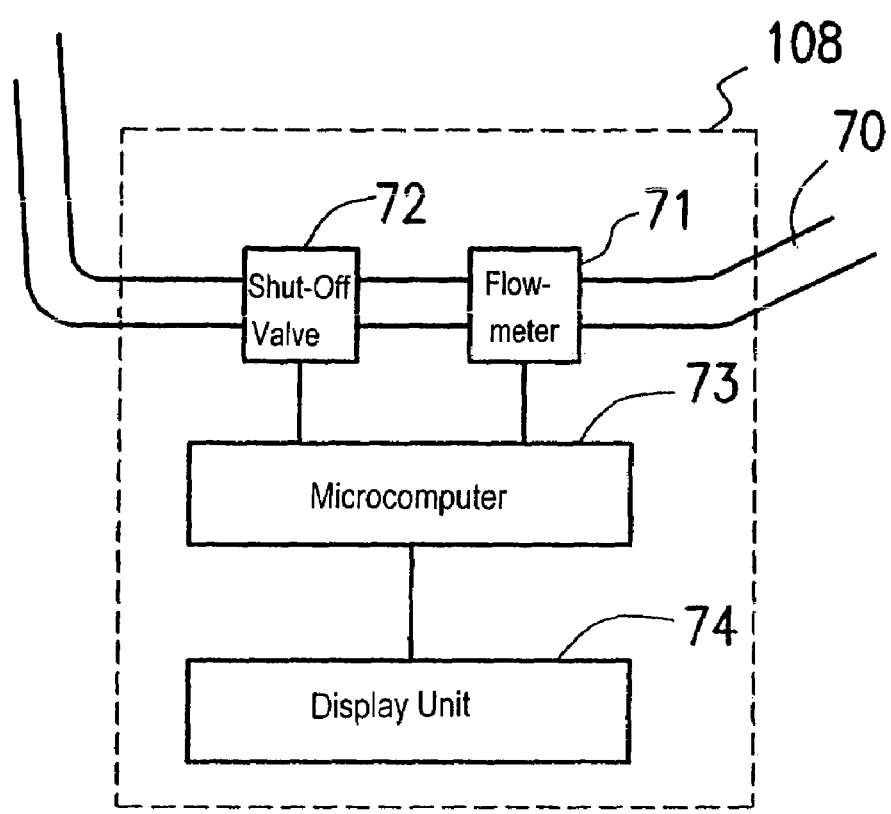
FIG. 24 is a block diagram showing an embodiment of a gas meter of the present invention.
Figure 25:
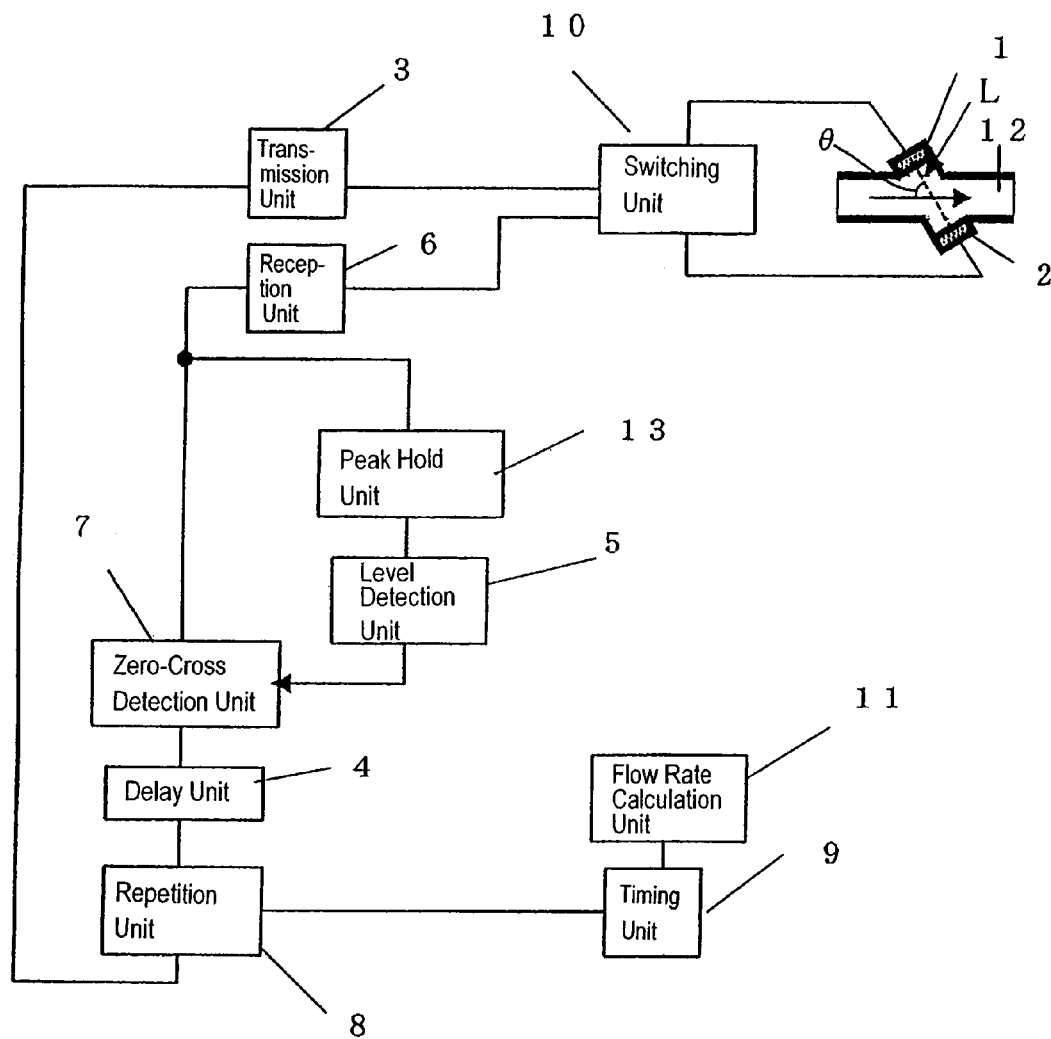
FIG. 25 is a block diagram showing a conventional ultrasonic flowmeter.
Figure 27:
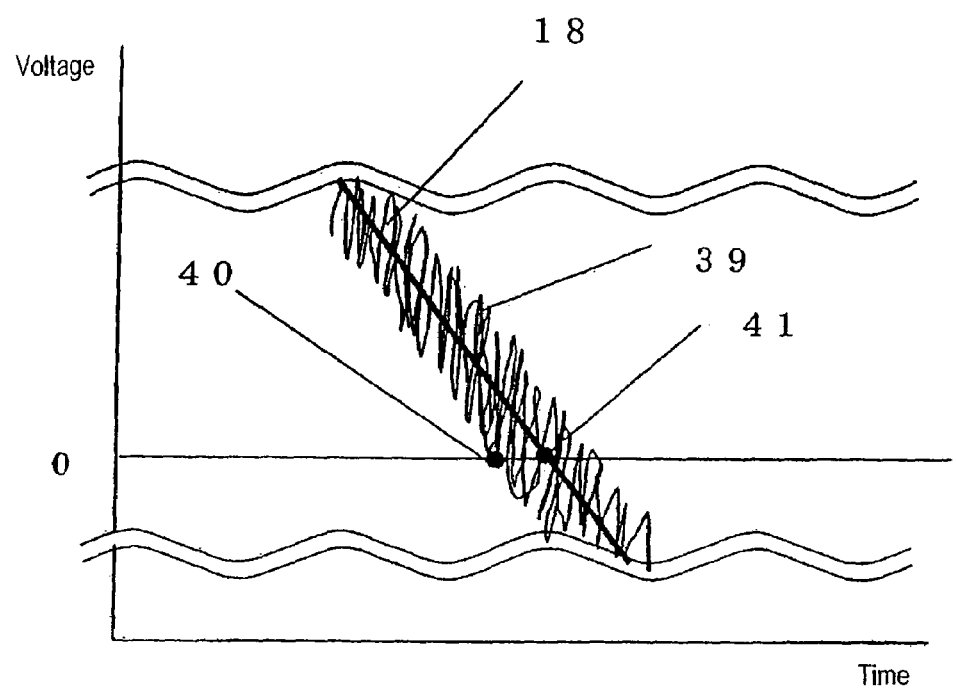
FIG. 27 is a diagram indicating that an error occurs in a zero-cross point detected as a propagation time because noise is superimposed on an ultrasonic signal.

FIG. 24 shows a block diagram of a gas meter 108 for measuring a flow volume of gas flowing in a pipe 70. The gas flowing in the pipe 70 may be gas used in a general home such as natural gas or propane gas or may be other gas such as hydrogen or oxygen.

The gas meter 108 includes an ultrasonic flowmeter 71 for measuring a flow volume of gas flowing in the pipe 70, a shut-off valve 72 that shuts off the gas flowing in the pipe 70 at the time of emergency, a signal processing device 73 such as a microcomputer that controls the ultrasonic flowmeter 71 and the shut-off valve 72, and a display unit 74 that uses the ultrasonic flowmeter 71 to display a measured flow volume, an integrated value of the flow volume, and other information.

Any one of the ultrasonic flowmeters of the first to the fifth embodiments is used in the ultrasonic flowmeter 71 of this embodiment.

Data concerning the flow volume to be measured by the ultrasonic flowmeter 71 is processed by the signal processing device 73 and displayed on the display unit 74. In addition, the signal processing device 73 watches whether there is abnormality in the flow volume to be measured. For example, in the case in which gas of a large flow volume starts flowing suddenly, the signal processing device 73 judges that gas leakage has occurred, operates the shut-off valve 72, and stops supply of gas.

The gas meter 108 may include a communication unit for sending data concerning the flow volume to be measured and information concerning gas leakage to a gas company and remotely operating the signal processing device 73 for maintenance from the gas company. In addition, in the case in which the ultrasonic flowmeter of the sixth embodiment is used as the ultrasonic flowmeter 71, the communication unit may receive information concerning specifications and operation states of gas appliances and home appliances, which are set in a predetermined range from the gas meter 108, from those appliances and refer to these pieces of information in determining a period of ripple.

According to the gas meter of this embodiment, highly accurate measurement can be performed. In particular, a gas meter is often set outdoors and is easily affected by noise from the outside. In addition, various gas appliances such as a gas heat pump are connected to a gas pipe, and ripple tends to occur in the gas pipe. The gas meter of this embodiment can cope with such a problem preferably and reduce a measurement error due to noise and ripple.

Note that, in the above-described embodiment, the correction unit has the function of reducing an error in zero-cross detection caused by noise or reducing a measurement error caused by ripple. It is needless to mention that the correction unit may include the constitution explained in the above-described embodiments to reduce a measurement error due to these causes. In addition, it is possible to preferably combine the fifth embodiment with the first to the fourth embodiments. According to such a combination, an ultrasonic flowmeter with extremely few measurement errors due to noise and ripple can be realized.

In addition, if at least one of the wave number measurement unit and the correction unit used in the flowmeter of the first to the fourth embodiments is used in a distance meter, a highly accurate distance meter can be realized.

Further, in the first and the fourth embodiments, a relation between amplitude and a propagation time or a zero-cross reference value of a wave subjected to zero-cross detection of a received signal is found. However, a relation between a maximum amplitude value and a propagation time or a zero-cross reference value included in a received signal may be found. Since there is a correlation between the maximum amplitude value and the propagation time or the zero-cross reference value as well, an error in zero-cross detection caused by noise can be reduced by using these relations.

INDUSTRIAL APPLICABILITY

According to the ultrasonic flowmeter of the present invention, a wave number of a received signal is measured by the wave number measurement unit. Consequently, even if amplitude of each wave of the received signal is irregular because a flow of fluid is disrupted, a wave, which should be subjected to zero-cross detection, can be specified surely. In addition, since an influence of noise can be reduced and an influence due to ripple of fluid can be reduced by the correction unit, highly accurate measurement can be performed.

The invention claimed is:
1. An ultrasonic flowmeter comprising:
   first and second ultrasonic transducers that send and receive an ultrasonic wave and are arranged so as to form a propagation path for the ultrasonic wave in a flow path of fluid;
   a transmission unit and a reception unit that drive the first ultrasonic transducer and the second ultrasonic transducer such that the ultrasonic wave is sent and received in two ways between the first ultrasonic transducer and the second ultrasonic transducer, and receive the ultrasonic wave;
   a zero-cross detection unit that measures a propagation time of the ultrasonic wave by subjecting a received signal generated by the ultrasonic wave received in the reception unit to zero-cross detection; and
   a correction unit that reduces an error in the zero-cross detection caused by noise superimposed on the received signal,
   wherein the correction unit includes:
      a level detection unit that measures amplitude of a predetermined wave of the received signal; and
      a correction data storage unit that stores data indicating a relation between the amplitude of the predetermined wave and the propagation time of the received signal, and
      the correction unit corrects the propagation time according to a magnitude of the amplitude of the predetermined wave dn the basis of the data, and
      the ultrasonic flowmeter calculates a flow volume of the fluid on the basis of the propagation time.
2. The ultrasonic flowmeter according to claim 1, wherein the predetermined wave of the received signal is a wave subjected to the zero-cross detection.
3. A gas meter comprising the ultrasonic flowmeter defined in claim 1.
4. An ultrasonic flowmeter comprising:
   first and second ultrasonic transducers that send and receive an ultrasonic wave and are arranged so as to form a propagation path for the ultrasonic wave in a flow path of fluid;
   a transmission unit and a reception unit that drive the first ultrasonic transducer and the second ultrasonic transducer such that the ultrasonic wave is sent and received in two ways between the first ultrasonic transducer and the second ultrasonic transducer, and receive the ultrasonic wave;
   a zero-cross detection unit that measures a propagation time of the ultrasonic wave by subjecting a received signal generated by the ultrasonic wave received in the reception unit to zero-cross detection; and
   a correction unit that reduces an error in the zero-cross detection caused by noise superimposed on the received signal,
   wherein the ultrasonic flowmeter receives an ultrasonic wave plural times in one of the first ultrasonic transducer and the second ultrasonic transducer with a sing around method and calculates a flow volume of the fluid on the basis of the propagation time,
   the correction unit includes: a level detection unit that measures amplitudes of predetermined waves of plural received signals generated by receiving the ultrasonic wave plural times, respectively; a level average unit that calculates an average of magnitudes of the amplitudes of the plural received signals; and a correction data storage unit that stores data indicating a relation between the amplitudes of the predetermined waves and the propagation time of the received signals, and the correction unit corrects the propagation time according to the average of the magnitudes of the amplitudes on the basis of the data.
5. A gas meter comprising the ultrasonic flowmeter defined in claim 4.

6. An ultrasonic flowmeter comprising:
   first and second ultrasonic transducers that send and receive an ultrasonic wave and are arranged so as to form a propagation path for the ultrasonic wave in a flow path of fluid;
   a transmission unit and a reception unit that drive the first ultrasonic transducer and the second ultrasonic transducer such that the ultrasonic wave is sent and received in two ways between the first ultrasonic transducer and the second ultrasonic transducer, and receive the ultrasonic wave;
   a zero-cross detection unit that measures a propagation time of the ultrasonic wave by subjecting a received signal generated by the ultrasonic wave received in the reception unit to zero-cross detection; and
   a correction unit that reduces an error in the zero-cross detection caused by noise superimposed on the received signal,
   wherein the ultrasonic flowmeter calculates a flow volume of the fluid on the basis of the propagation time,
   the zero-cross detection unit has a comparator for finding a zero-cross point, and
   the correction unit corrects the flow volume of the fluid on the basis of the number of times of chattering of the comparator that is caused when the received signal is subjected to the zero-cross detection.

7. The ultrasonic flowmeter according to claim 6,
   wherein the correction unit includes:
   a counter that measures the number of times of chattering; and
   a correction data storage unit that stores data indicating a relation between the number of times of chattering and a propagation time, and
   the correction unit corrects the propagation time according to the number of times of chattering on the basis of the data.

8. A gas meter comprising the ultrasonic flowmeter defined in claim 6.

9. An ultrasonic flowmeter comprising:
   first and second ultrasonic transducers that send and receive an ultrasonic wave and are arranged so as to form a propagation path for the ultrasonic wave in a flow path of fluid;
   a transmission unit and a reception unit that drive the first ultrasonic transducer and the second ultrasonic transducer such that the ultrasonic wave is sent and received in two ways between the first ultrasonic transducer and the second ultrasonic transducer, and receive the ultrasonic wave;
   a zero-cross detection unit that measures a propagation time of the ultrasonic wave by subjecting a received signal generated by the ultrasonic wave received in the reception unit to zero-cross detection; and
   a correction unit that reduces an error in the zero-cross detection caused by noise superimposed on the received signal,
   wherein, the ultrasonic flowmeter calculates a flow volume of the fluid on the basis of the propagation time, and
   depending upon whether the zero-cross detection for the received signal is performed at a falling edge of a signal or a rising edge of a signal, the correction unit uses a voltage set to a negative or positive value as a reference voltage for the zero-cross detection.

10. A gas meter comprising the ultrasonic flowmeter defined in claim 9.

11. An ultrasonic flowmeter comprising:
   first and second ultrasonic transducers that send and receive an ultrasonic wave and are arranged so as to form a propagation path for the ultrasonic wave in a flow path of fluid;
   a transmission unit and a reception unit that drive the first ultrasonic transducer and the second ultrasonic transducer such that the ultrasonic wave is sent and received in two ways between the first ultrasonic transducer and the second ultrasonic transducer, and receive the ultrasonic wave;
   a zero-cross detection unit that measures a propagation time of the ultrasonic wave by subjecting a received signal generated by the ultrasonic wave received in the reception unit to zero-cross detection; and
   a correction unit that reduces an error in the zero-cross detection caused by noise superimposed on the received signal,
   wherein the ultrasonic flowmeter calculates a flow volume of the fluid on the basis of the propagation time, and
   the ultrasonic flowmeter receives an ultrasonic wave plural times in one of the first ultrasonic transducer and the second ultrasonic transducer with the sing around method, and
   the correction unit offsets a reference voltage for performing the zero-cross detection for the next received signal on the basis of a magnitude of amplitude of an immediately preceding received signal among plural received signals generated by receiving the ultrasonic wave plural times.

12. The ultrasonic flowmeter according to claim 11,
   wherein the correction unit includes: a level detection unit that measures amplitude of a predetermined wave of the immediately preceding received signal; and a correction data storage unit that stores data indicating a relation between amplitude of a wave of the received signal and a reference voltage for performing the zero-cross detection, and the correction unit calculates a value of the reference voltage according to a magnitude of the amplitude on the basis of the data.

13. The ultrasonic flowmeter according to claim 11,
   wherein the correction unit includes: an integration unit that calculates a value obtained by integrating a rising edge part of the immediately preceding received signal for a predetermined time; and a correction data storage unit that store data indicating a relation between the integrated value and a reference voltage for performing the zero-cross detection, and the correction unit calculates a value of the reference voltage according to a magnitude of the integrated value on the basis of the data.

14. A gas meter comprising the ultrasonic flowmeter defined in claim 11.

15. A flow volume measurement method by an ultrasonic wave that measures a flow volume of fluid on the basis of a propagation time difference of an ultrasonic wave, comprising the steps of:
   sending an ultrasonic wave from a first ultrasonic transducer to fluid and receiving the ultrasonic wave in a second ultrasonic transducer;
   measuring a propagation time of the ultrasonic wave by subjecting a received signal generated by the received ultrasonic wave to zero-cross detection;
   measuring amplitude of the received signal; and
   correcting the propagation time on the basis of the amplitude of the received signal, using data indicating a relation between the amplitude of the predetermined wave and the propagation time of the received signal.

16. The flow volume measurement method by an ultrasonic wave according to claim 15,
wherein the step of measuring amplitude measures amplitude of a wave of a received signal subjected to the zero-cross detection.

17. A computer readable recording medium having recorded therein a program for causing a computer to execute the respective steps defined in the flow volume measurement method by an ultrasonic wave according to claim 15.

18. A flow volume measurement method by an ultrasonic wave that measures a flow volume of fluid on the basis of a propagation time difference of an ultrasonic wave, comprising the steps of:
sending an ultrasonic wave plural times from a first ultrasonic transducer to fluid and receiving the ultrasonic wave plural times in a second ultrasonic transducer with a sing around method;
measuring a propagation time of the ultrasonic wave, which is received plural times, by subjecting plural received signals due to the ultrasonic wave received plural times to zero-cross detection;
measuring amplitudes of the plural received signals; and
calculating an average value of the amplitudes of the plural received signals and correcting the propagation time on the basis of the average value.

19. A flow volume measurement method by an ultrasonic wave that measures a flow volume of fluid on the basis of a propagation time difference of an ultrasonic wave, comprising the steps of:
sending an ultrasonic wave from a first ultrasonic transducer to fluid and receiving the ultrasonic wave in a second ultrasonic transducer;
measuring a propagation time of the ultrasonic wave by subjecting a received signal generated by the received ultrasonic wave to zero-cross detection;
measuring the number of times of chattering of a comparator that occurs at the time of the zero-cross detection; and
correcting the propagation time on the basis of the number of times of chattering.

20. A flow volume measurement method by an ultrasonic wave that measures a flow volume of fluid on the basis of a propagation time difference of an ultrasonic wave, comprising the steps of:
sending an ultrasonic wave from a first ultrasonic transducer to fluid and receiving the ultrasonic wave in a second ultrasonic transducer;
measuring a propagation time of the ultrasonic wave by subjecting a received signal generated by the received ultrasonic wave to zero-cross detection; and
calculating a flow volume of the fluid on the basis of the propagation time,
wherein the flow volume measurement method sets a reference potential for the zero-cross detection set to a negative voltage or a positive voltage depending upon whether the zero-cross detection is performed at a rising edge of a signal or a falling edge of a signal.

21. A flow volume measurement method by an ultrasonic wave that measures a flow volume of fluid on the basis of a propagation time difference of an ultrasonic wave, comprising the steps of:
sending an ultrasonic wave from a first ultrasonic transducer to fluid and receiving the ultrasonic wave in a second ultrasonic transducer;
measuring amplitude of a received signal generated by the received ultrasonic wave; and
measuring a propagation time of the ultrasonic wave by subjecting the received signal to zero-cross detection,
wherein the flow volume measurement method repeats the reception step, the amplitude measurement step, and the propagation time measurement step with a sing around method and offsets a reference voltage for performing the zero-cross detection for the next received signal on the basis of a magnitude of the amplitude of the received signal measured in the amplitude measurement step.

22. A flow volume measurement method by an ultrasonic wave that measures a flow volume of fluid on the basis of a propagation time difference of an ultrasonic wave, comprising the steps of:
sending an ultrasonic wave from a first ultrasonic transducer to fluid and receiving the ultrasonic wave in a second ultrasonic transducer;
calculating a value obtained by integrating a rising edge part of a received signal generated by the received ultrasonic wave for a predetermined time; and
measuring a propagation time of the ultrasonic wave by subjecting the received signal to zero-cross detection,
wherein the flow volume measurement method repeats the reception step, the step of calculating an integrated value, and the propagation time measurement step with a sing around method and offsets a reference voltage for performing the zero-cross detection for the next received signal on the basis of the integrated value of the received signal calculated in the step of calculating an integrated value.

* * * * *

UNITED STATES PATENT AND TRADEMARK OFFICE
CERTIFICATE OF CORRECTION

PATENT NO.       : 7,073,395 B2
APPLICATION NO.  : 10/502698
DATED            : July 11, 2006
INVENTOR(S)      : Takehiko Suginouchi et al.

It is certified that error appears in the above-identified patent and that said Letters Patent is hereby corrected as shown below:

Title Page, item (54):
The title should read -- ULTRASONIC FLOWMETER AND FLOW MEASUREMENT METHOD BY ULTRASONIC WAVE --;

Column 22, line 20:

Replace "dn" with -- on --.

Signed and Sealed this

Twenty-seventh Day of March, 2007

JON W. DUDAS
*Director of the United States Patent and Trademark Office*